United States Patent
Chen

(10) Patent No.: US 9,625,680 B2
(45) Date of Patent: Apr. 18, 2017

(54) OPTICAL PHOTOGRAPHING LENS ASSEMBLY, IMAGE CAPTURING APPARATUS AND ELECTRONIC DEVICE

(71) Applicant: LARGAN PRECISION CO., LTD., Taichung (TW)

(72) Inventor: Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/798,746

(22) Filed: Jul. 14, 2015

(65) Prior Publication Data

US 2016/0334607 A1    Nov. 17, 2016

(30) Foreign Application Priority Data

May 12, 2015    (TW) .............................. 104115062 A

(51) Int. Cl.
  *G02B 13/00*  (2006.01)
  *G02B 9/60*   (2006.01)

(52) U.S. Cl.
  CPC ........... *G02B 13/0045* (2013.01); *G02B 9/60* (2013.01)

(58) Field of Classification Search
  CPC ................................................ G02B 13/0045
  USPC ........................................................ 359/714
  See application file for complete search history.

(56) References Cited

U.S. PATENT DOCUMENTS

| 8,780,459 | B2 | 7/2014 | Chen |
| 2010/0290130 | A1 | 11/2010 | Okamoto |
| 2015/0022714 | A1 | 1/2015 | Huang |
| 2015/0185440 | A1 | 7/2015 | Chen |
| 2015/0241660 | A1 | 8/2015 | Son |
| 2016/0091691 | A1* | 3/2016 | Son .......................... G02B 9/60 348/373 |

FOREIGN PATENT DOCUMENTS

| JP | 2009-186596 A | 8/2009 |
| TW | I456247 B | 11/2013 |
| TW | I479187 B | 5/2014 |

\* cited by examiner

*Primary Examiner* — James Jones
(74) *Attorney, Agent, or Firm* — McClure, Qualey & Rodack, LLP

(57) ABSTRACT

An optical photographing lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element has positive refractive power. The third lens element has negative refractive power. The fourth lens element has negative refractive power. The fifth lens element with refractive power has an image-side surface being concave in a paraxial region thereof, wherein the image-side surface of the fifth lens element comprises at least one convex shape in an off-axis region thereof, and an object-side surface and the image-side surface of the fifth lens element are aspheric.

43 Claims, 20 Drawing Sheets

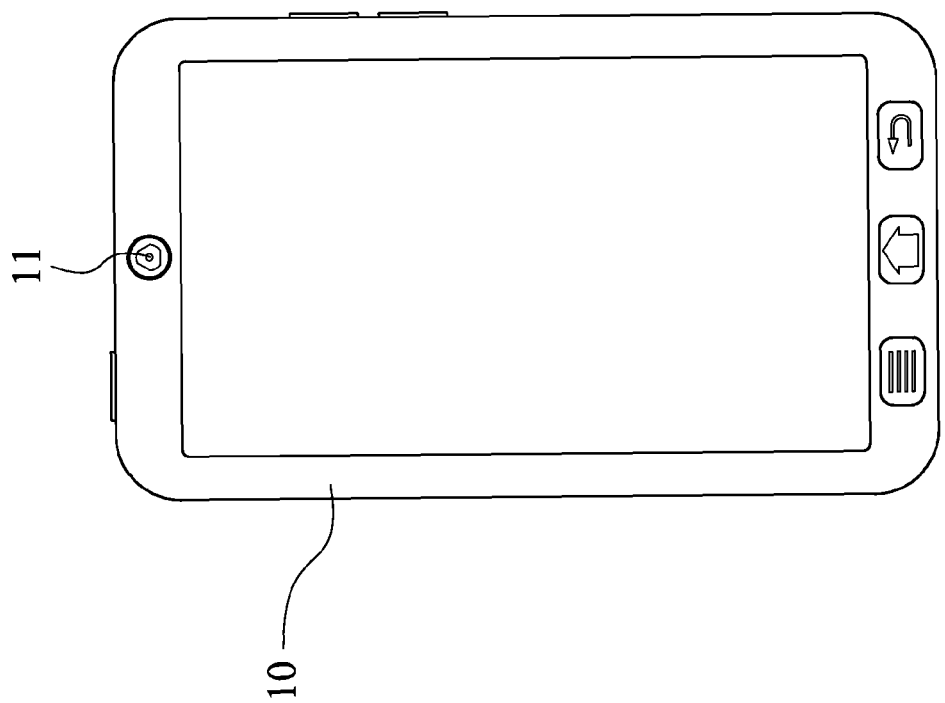

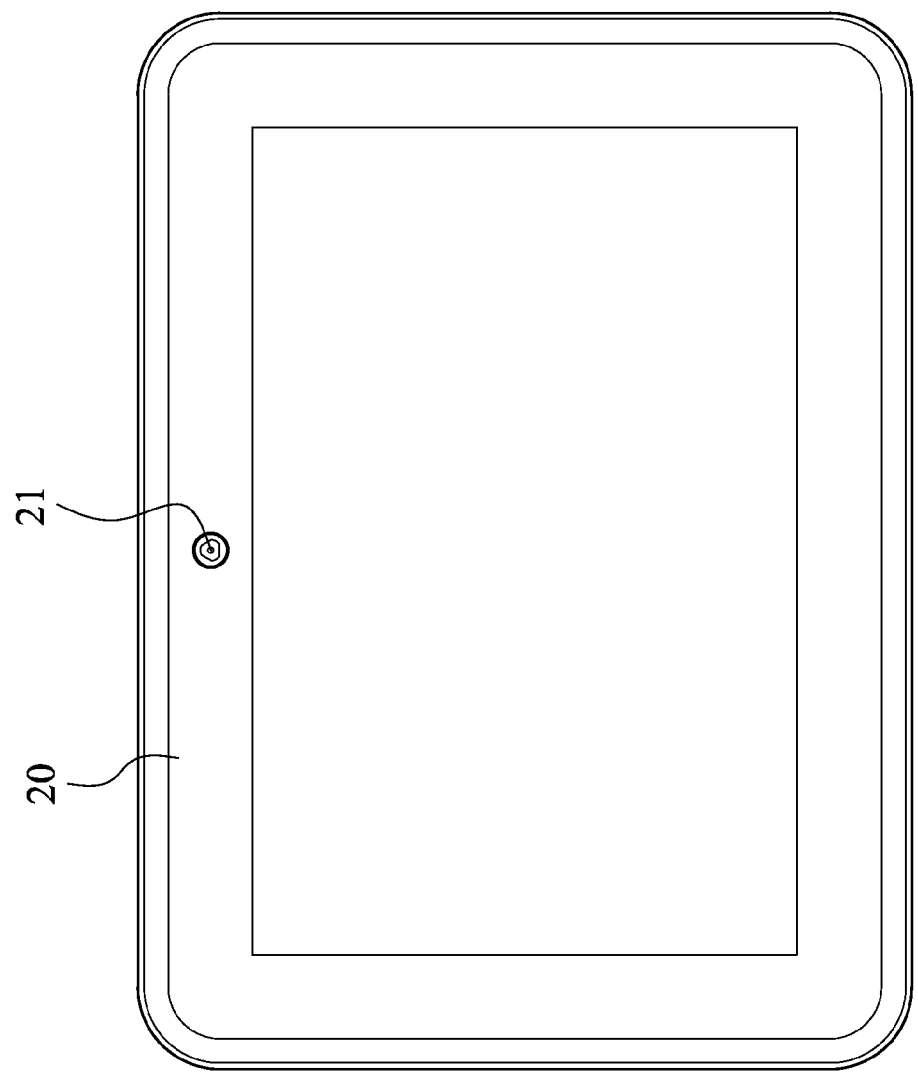

US 9,625,680 B2

OPTICAL PHOTOGRAPHING LENS ASSEMBLY, IMAGE CAPTURING APPARATUS AND ELECTRONIC DEVICE

RELATED APPLICATIONS

This application claims priority to Taiwan Application Serial Number 104115062, filed May 12, 2015, which is herein incorporated by reference.

BACKGROUND

Technical Field

The present disclosure relates to an optical photographing lens assembly and an image capturing apparatus. More particularly, the present disclosure relates to a compact optical photographing lens assembly and an image capturing apparatus applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with five-element lens structure are disclosed. However, the configuration of the refractive power of the lens elements is not favorable for providing a larger field of view and a shorter total track length simultaneously. Furthermore, the optical systems with five-element lens structure still cannot provide a desired image quality.

SUMMARY

According to one aspect of the present disclosure, an optical photographing lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element has positive refractive power. The third lens element has negative refractive power. The fourth lens element has negative refractive power. The fifth lens element with refractive power has an image-side surface being concave in a paraxial region thereof, wherein the image-side surface of the fifth lens element includes at least one convex shape in an off-axis region thereof, and an object-side surface and the image-side surface of the fifth lens element are aspheric. The optical photographing lens assembly has a total of five lens elements with refractive power, and an axial distance is between every two lens elements of the first lens element, the second lens element, the third lens element, the fourth lens element and the fifth lens element which are adjacent to each other. When a focal length of the first lens element is f1, and a focal length of the second lens element is f2, the following condition is satisfied:

$|f2/f1|<1.0.$

According to another aspect of the present disclosure, an image capturing apparatus includes the optical photographing lens assembly according to the aforementioned aspect and an image sensor, wherein the image sensor is disposed on an image surface of the optical photographing lens assembly.

According to yet another aspect of the present disclosure, an electronic device includes the image capturing apparatus according to the aforementioned aspect.

BRIEF DESCRIPTION OF THE DRAWINGS

The disclosure can be more fully understood by reading the following detailed description of the embodiment, with reference made to the accompanying drawings as follows:

FIG. 19 is a schematic view of an electronic device according to the 9th embodiment of the present disclosure;

FIG. 20 is a schematic view of an electronic device according to the 10th embodiment of the present disclosure.

DETAILED DESCRIPTION

Figure 1:
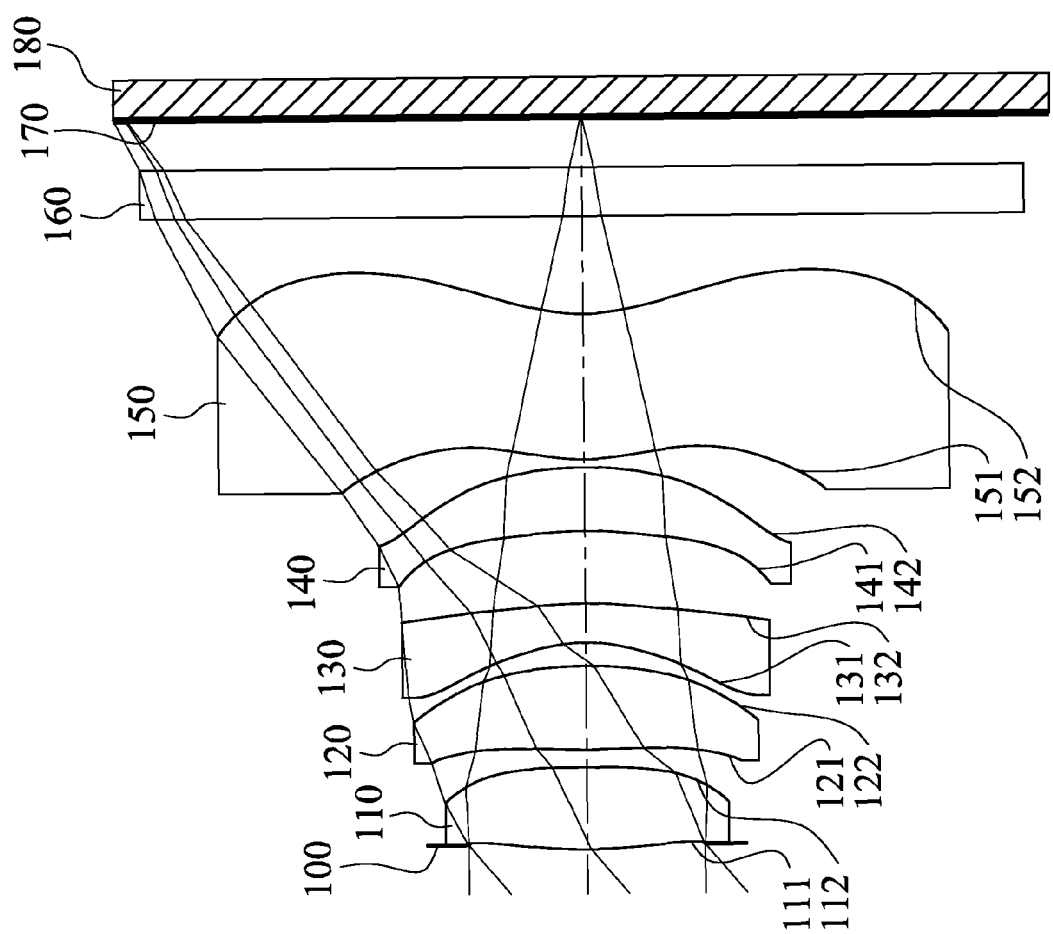
FIG. 1 is a schematic view of an image capturing apparatus according to the 1st embodiment of the present disclosure.

An optical photographing lens assembly includes, in order from an object side to an image side, a first lens element, a second lens element, a third lens element, a fourth lens element and a fifth lens element, wherein the optical photographing lens assembly has a total of five lens elements with refractive power.

There is an axial distance between every two lens elements of the first lens element, the second lens element, the third lens element, the fourth lens element and the fifth lens element which are adjacent to each other. That is, each of the first through fifth lens elements is a single and non-cemented lens element, any two lens elements adjacent to each other are not cemented, and there is a space between the two lens elements. In other words, of the first lens element, the second lens element, the third lens element, the fourth lens element and the fifth lens element of the optical photographing lens assembly, there is a space in a paraxial region between every two lens elements that are adjacent to each other. Moreover, the manufacturing process of the cemented lenses is more complex than the non-cemented lenses. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the optical photographing lens assembly. Therefore, according to the optical photographing lens assembly of the present disclosure, an axial distance in a paraxial region between every two of the first lens element, the second lens element, the third lens element, the fourth lens element and the fifth lens element that are adjacent to each other avoids the problem generated by the cemented lens elements.

The first lens element with positive refractive power has an object-side surface being convex in a paraxial region thereof. Therefore, the total track length of the optical photographing lens assembly can be reduced, and the compact size thereof can be maintained. Furthermore, an image-side surface of the first lens element can include at least one convex shape in an off-axis region thereof, so that the aberration of the off-axis field can be corrected.

The second lens element with positive refractive power can have an object-side surface being convex in a paraxial region thereof and an image-side surface being convex in a paraxial region thereof. Therefore, the distribution of the positive refractive power of the optical photographing lens assembly can be balanced, and the power distribution sensitivity and the spherical aberration can be reduced. Furthermore, the object-side surface of the second lens element can include at least one concave shape in an off-axis region thereof, so that the aberration of the off-axis field can be corrected.

The third lens element with negative refractive power can have an object-side surface being concave in a paraxial region thereof. Therefore, the aberration of the optical photographing lens assembly can be corrected, and the image quality can be enhanced.

The fourth lens element with negative refractive power can have an object-side surface being concave in a paraxial region thereof and an image-side surface being convex in a paraxial region thereof. Therefore, the aberration and the astigmatism of the optical photographing lens assembly can be corrected, and the image quality can be enhanced.

The fifth lens element can have positive refractive power, and has an image-side surface being concave in a paraxial region thereof, wherein the image-side surface of the fifth lens element includes at least one convex shape in an off-axis region thereof. Therefore, the total track length of the optical photographing lens assembly can be reduced, and the aberration of the off-axis field can be corrected.

When a focal length of the first lens element is f1, and a focal length of the second lens element is f2, the following condition is satisfied: $|f2/f1|<1.0$. Therefore, light rays of the larger field of view are allowed to enter the optical photographing lens assembly, and the field of view of the optical photographing lens assembly can be enlarged. Preferably, the following condition can be satisfied: $|f2/f1|<0.80$.

When an Abbe number of the fourth lens element is V4, the following condition can be satisfied: $V4<30$. Therefore, the chromatic aberration of the optical photographing lens assembly can be corrected.

When the focal length of the second lens element is f2, a focal length of the third lens element is f3, and a focal length of the fourth lens element is f4, the following condition can be satisfied: $|f2/f3|+|f2/f4|<1.0$. Therefore, the field of view of the optical photographing lens assembly can be enlarged, and the peripheral luminance can be enhanced.

When a curvature radius of the object-side surface of the third lens element is R5, and a curvature radius of an image-side surface of the third lens element is R6, the following condition can be satisfied: $0 \text{ mm}^2 < R5 \times R6$. Therefore, the generation of the aberration can be reduced.

When a curvature radius of the object-side surface of the second lens element is R3, and a curvature radius of the image-side surface of the second lens element is R4, the following condition can be satisfied: $-0.20<(R3+R4)/(R3-R4)<2.0$. Therefore, the generation of the spherical aberration and the astigmatism can be reduced, and the image quality can be enhanced.

When a sum of the axial distances between every two lens elements of the first lens element, the second lens element, the third lens element, the fourth lens element and the fifth lens element which are adjacent to each other is ΣAT, and a focal length of the optical photographing lens assembly is f, the following condition can be satisfied: $\Sigma AT/f<0.30$. Therefore, the axial distance between every two lens elements is not excessive, which is favorable for molding of the lens elements and assembling the optical photographing lens assembly. Specifically, when an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following condition is satisfied: ΣAT=T12+T23+T34+T45.

When a central thickness of the first lens element is CT1, and a central thickness of the second lens element is CT2, the following condition can be satisfied: 0.20<CT1/CT2<1.25. Therefore, it is favorable for distributing the positive refractive power of the optical photographing lens assembly, so that the power distribution sensitivity can be reduced and the manufacturing yield rate can be enhanced.

When a distance in parallel with an optical axis from an axial vertex on the image-side surface of the fourth lens element to a maximum effective radius position on the image-side surface of the fourth lens element is Sag42 (wherein the distance towards the image side of the optical photographing lens assembly is positive, and the distance towards the object side of the optical photographing lens assembly is negative), and a central thickness of the fourth lens element is CT4, the following condition can be satisfied: −1.50<Sag42/CT4<−0.60. Therefore, the shape of the fourth lens element is proper, and is favorable for manufacturing and molding.

When a distance in parallel with the optical axis from an axial vertex on the object-side surface of the third lens element to a maximum effective radius position on the object-side surface of the third lens element is Sag31 (wherein the distance towards the image side of the optical photographing lens assembly is positive, and the distance towards the object side of the optical photographing lens assembly is negative), a distance in parallel with the optical axis from an axial vertex on the image-side surface of the third lens element to a maximum effective radius position on the image-side surface of the third lens element is Sag32 (wherein the distance towards the image side of the optical photographing lens assembly is positive, and the distance towards the object side of the optical photographing lens assembly is negative), and a central thickness of the third lens element is CT3, the following condition can be satisfied: −0.50<(Sag31−Sag32)/CT3<0.75. Therefore, the shape of the third lens element is proper, and is favorable for manufacturing and molding.

At least one surface of each of the first lens element, the second lens element, the third lens element and the fourth lens element includes at least one inflection point. Therefore, the aberration of the off-axis field can be corrected, and the image quality of the peripheral image can be enhanced.

When a maximum of the axial distances between every two lens elements of the first lens element, the second lens element, the third lens element, the fourth lens element and the fifth lens element which are adjacent to each other is ATmax, and the sum of the axial distances between every two lens elements of the first lens element, the second lens element, the third lens element, the fourth lens element and the fifth lens element which are adjacent to each other is ΣAT, the following condition can be satisfied: 0.80<ATmax/(ΣAT−ATmax). Therefore, the sensitivity of the axial distance arrangement between lens elements can be well controlled. Specifically, when the axial distance between the first lens element and the second lens element is T12, the axial distance between the second lens element and the third lens element is T23, the axial distance between the third lens element and the fourth lens element is T34, and the axial distance between the fourth lens element and the fifth lens element is T45, a maximum of T12, T23, T34 and T45 is ATmax.

When the focal length of the second lens element is f2, and the focal length of the fourth lens element is f4, the following condition can be satisfied: −20.0<f4/f2<−1.0. Therefore, the change of the refractive power between lens elements can be reduced, so that excessive stray light rays can be avoided, and the image quality can be maintained. Preferably, the following condition can be satisfied: −15.0<f4/f2<−1.5. More preferably, the following condition can be satisfied: −10.0<f4/f2<−1.5.

When an Abbe number of the third lens element is V3, and the Abbe number of the fourth lens element is V4, the following condition can be satisfied: 0.80<V3/V4<3.0. Therefore, it is favorable for balancing corrections of the chromatic aberration and the astigmatism.

According to the optical photographing lens assembly of the present disclosure, the lens elements thereof can be made of glass or plastic material. When the lens elements are made of glass material, the distribution of the refractive powers of the optical photographing lens assembly may be more flexible to design. When the lens elements are made of plastic material, the manufacturing cost can be effectively reduced. Furthermore, surfaces of each lens element can be arranged to be aspheric (ASP), since the aspheric surface of the lens element is easy to form a shape other than spherical surface so as to have more controllable variables for eliminating the aberration thereof, and to further decrease the required number of the lens elements. Therefore, the total track length of the optical photographing lens assembly can also be reduced.

According to the optical photographing lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, if not stated otherwise, when the lens element has a convex surface, it indicates that the surface is convex in the paraxial region thereof; when the lens element has a concave surface, it indicates that the surface is concave in the paraxial region thereof. According to the optical photographing lens assembly of the present disclosure, the positive refractive power or the negative refractive power of a lens element or the focal length of the lens element, that is, may refer to the refractive power or the focal length in the paraxial region of the lens element.

According to the optical photographing lens assembly of the present disclosure, the image surface of the optical photographing lens assembly, based on the corresponding image sensor, can be flat or curved. In particular, the image surface can be a curved surface being concave facing towards the object side.

According to the optical photographing lens assembly of the present disclosure, the optical photographing lens assembly can include at least one stop, such as an aperture stop, a glare stop or a field stop. Said glare stop or said field stop is for eliminating the stray light and thereby improving the image resolution thereof.

According to the optical photographing lens assembly of the present disclosure, an aperture stop can be configured as a front stop or a middle stop. The front stop disposed between an imaged object and the first lens element can provide a longer distance from an exit pupil of the optical photographing lens assembly to the image surface and thereby improves the image-sensing efficiency of an image sensor. A middle stop disposed between the first lens element and the image surface is favorable for enlarging the field of view of the optical photographing lens assembly and thereby provides a wider field of view for the same.

According to the optical photographing lens assembly of the present disclosure, the optical photographing lens assembly can be optionally applied to moving focus optical systems, and is featured with good ability for correcting aberration and high image quality. The optical photographing lens assembly of the present disclosure also can be applied to 3D (three-dimensional) image capturing applications, in products such as digital cameras, mobile devices, digital tablets, smart TV, surveillance devices, game consoles with motion sensing function, driving recording systems, rear view camera systems, and wearable devices.

According to the present disclosure, an image capturing apparatus is provided. The image capturing apparatus includes the aforementioned optical photographing lens assembly and an image sensor, wherein the image sensor is disposed at the image side of the aforementioned optical photographing lens assembly, that is, the image sensor can be disposed on or near the image surface of the aforementioned optical photographing lens assembly. In the optical photographing lens assembly, the distribution of the refractive power of the first lens element and the second lens element is proper, so that light rays of the larger field of view are allowed to enter the optical photographing lens assembly. Moreover, the first lens element has positive refractive power, so that the total track length of the optical photographing lens assembly can be reduced, and the compact size can be maintained. Therefore, the image capturing apparatus can have a larger field of view and a shorter total track length at the same time. Furthermore, the second lens element has positive refractive, and the fourth lens element has negative refractive. Therefore, the excessively strong refractive power of a single lens element can be avoided by the configuration of the refractive power of the second lens element and the fourth lens element, and an excessive aberration can be avoided, too. Preferably, the image capturing apparatus can further include a barrel member, a holding member or a combination thereof.

According to the present disclosure, an electronic device is provided. The electronic device includes the aforementioned image capturing apparatus. Therefore, the image quality of the long-shot can be improved while maintaining the compact size of the electronic device. Preferably, the electronic device can further include but not limited to a control unit, a display, a storage unit, a random access memory unit (RAM), a read only memory unit (ROM) or a combination thereof.

According to the above description of the present disclosure, the following 1st-11th specific embodiments are provided for further explanation.

1st Embodiment

Figure 2:
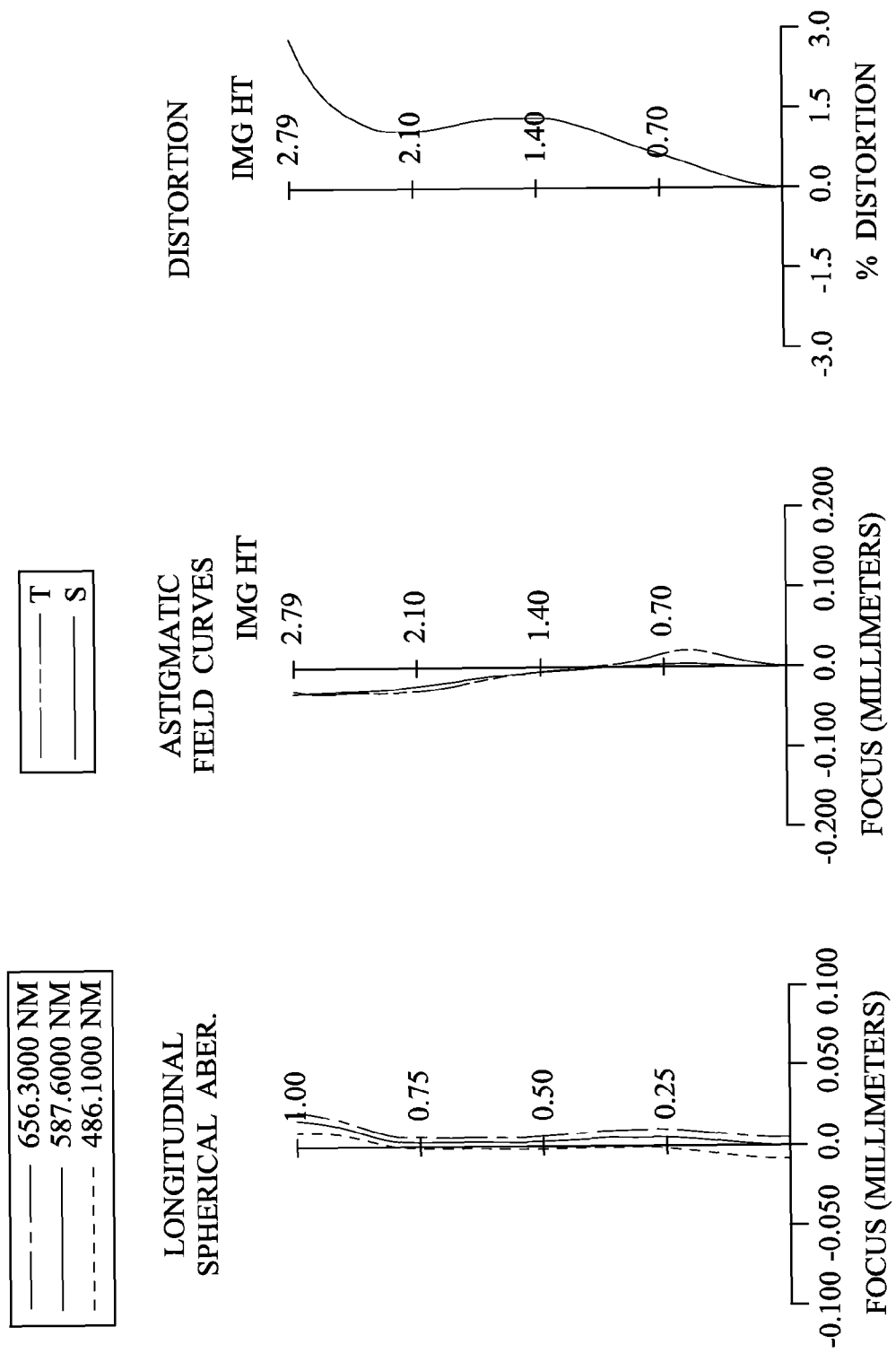
FIG. 2 shows spherical aberration curves, astigmatic field curves and a distortion curve of the image capturing apparatus according to the 1st embodiment.

FIG. 1 is a schematic view of an image capturing apparatus according to the 1st embodiment of the present disclosure. FIG. 2 shows spherical aberration curves, astigmatic field curves and a distortion curve of the image capturing apparatus according to the 1st embodiment. In FIG. 1, the image capturing apparatus includes an optical photographing lens assembly (its reference numeral is omitted) and an image sensor 180. The optical photographing lens assembly includes, in order from an object side to an image side, an aperture stop 100, a first lens element 110, a second lens element 120, a third lens element 130, a fourth lens element 140, a fifth lens element 150, an IR-cut filter 160 and an image surface 170, wherein the image sensor 180 is disposed on the image surface 170 of the optical photographing lens assembly. The optical photographing lens assembly has a total of five lens elements (110-150) with refractive power. There is an axial distance in a paraxial region between every two of the first lens element 110, the second lens element 120, the third lens element 130, the fourth lens element 140 and the fifth lens element 150 that are adjacent to each other.

The first lens element 110 with positive refractive power has an object-side surface 111 being convex in a paraxial region thereof and an image-side surface 112 being convex in a paraxial region thereof. The first lens element 110 is made of plastic material, and has the object-side surface 111 and the image-side surface 112 being both aspheric. Furthermore, the image-side surface 112 of the first lens element 110 includes at least one convex shape in an off-axial region thereof, and the object-side surface 111 of the first lens element 110 includes at least one inflection point.

The second lens element 120 with positive refractive power has an object-side surface 121 being convex in a paraxial region thereof and an image-side surface 122 being convex in a paraxial region thereof. The second lens element 120 is made of plastic material, and has the object-side surface 121 and the image-side surface 122 being both aspheric. Furthermore, the object-side surface 121 of the second lens element 120 includes at least one concave shape in an off-axial region thereof, and the object-side surface 121 of the second lens element 120 includes at least one inflection point.

The third lens element 130 with negative refractive power has an object-side surface 131 being concave in a paraxial region thereof and an image-side surface 132 being convex in a paraxial region thereof. The third lens element 130 is made of plastic material, and has the object-side surface 131 and the image-side surface 132 being both aspheric. Furthermore, the object-side surface 131 and the image-side surface 132 of the third lens element 130 both include at least one inflection point.

The fourth lens element 140 with negative refractive power has an object-side surface 141 being concave in a paraxial region thereof and an image-side surface 142 being convex in a paraxial region thereof. The fourth lens element 140 is made of plastic material, and has the object-side surface 141 and the image-side surface 142 being both aspheric. Furthermore, the image-side surface 142 of the fourth lens element 140 includes at least one inflection point.

The fifth lens element 150 with positive refractive power has an object-side surface 151 being convex in a paraxial region thereof and an image-side surface 152 being concave in a paraxial region thereof. The fifth lens element 150 is made of plastic material, and has the object-side surface 151 and the image-side surface 152 being both aspheric. Furthermore, the image-side surface 152 of the fifth lens element 150 includes at least one convex shape in an off-axial region thereof.

The IR-cut filter 160 is made of glass material and located between the fifth lens element 150 and the image surface 170, and will not affect a focal length of the optical photographing lens assembly.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical photographing lens assembly according to the 1st embodiment, when a focal length of the optical photographing lens assembly is f, an f-number of the optical photographing lens assembly is Fno, and half of a maximal field of view of the optical photographing lens assembly is HFOV, these parameters have the following values: f=3.19 mm; Fno=2.20; and HFOV=40.4 degrees.

In the optical photographing lens assembly according to the 1st embodiment, when an Abbe number of the third lens element 130 is V3, and an Abbe number of the fourth lens element 140 is V4, the following conditions are satisfied: V3/V4=1.00; and V4=23.5.

In the optical photographing lens assembly according to the 1st embodiment, when a central thickness of the first lens element 110 is CT1, and a central thickness of the second lens element 120 is CT2, the following condition is satisfied: CT1/CT2=0.98.

In the optical photographing lens assembly according to the 1st embodiment, when a maximum of the axial distances between every two lens elements of the first lens element 110, the second lens element 120, the third lens element 130, the fourth lens element 140 and the fifth lens element 150 which are adjacent to each other is ATmax (In the 1st embodiment, ATmax is the axial distance between the third lens element 130 and the fourth lens element 140, and ATmax=0.445 mm.), a sum of the axial distances between every two lens elements of the first lens element 110, the second lens element 120, the third lens element 130, the fourth lens element 140 and the fifth lens element 150 which are adjacent to each other is ΣAT (In the 1st embodiment, ΣAT=0.109 mm+0.143 mm+0.445 mm+0.050 mm=0.747 mm.), and the focal length of the optical photographing lens assembly is f, the following conditions are satisfied: ATmax/(ΣAT−ATmax)=1.47; and ΣAT/f=0.23.

Figure 17:
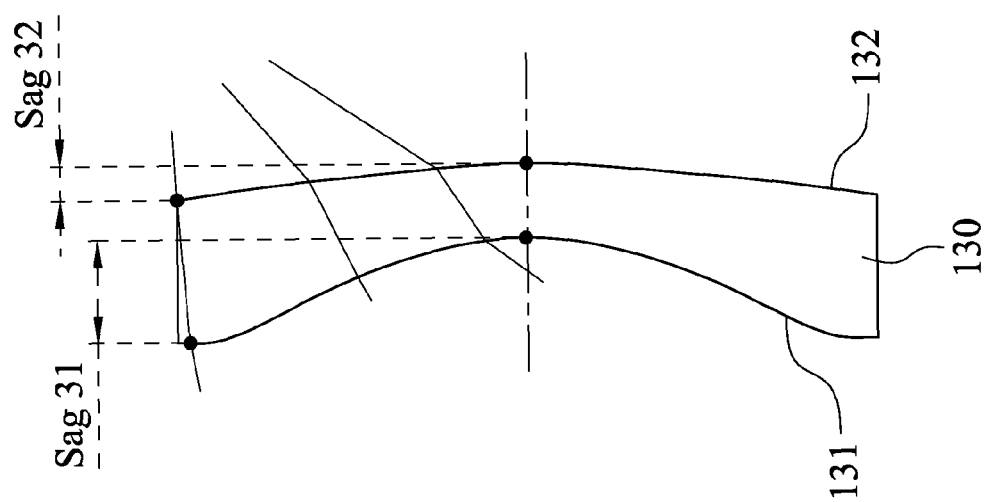
FIG. 17 shows a schematic view of the parameters Sag31 and Sag32 of a third lens element according to the 1st embodiment of FIG. 1.

FIG. 17 shows a schematic view of the parameters Sag31 and Sag32 of the third lens element 130 according to the 1st embodiment. In FIG. 17, when a distance in parallel with the optical axis from an axial vertex on the object-side surface 131 of the third lens element 130 to a maximum effective radius position on the object-side surface 131 of the third lens element 130 is Sag31, a distance in parallel with the optical axis from an axial vertex on the image-side surface 132 of the third lens element 130 to a maximum effective radius position on the image-side surface 132 of the third lens element 130 is Sag32, and a central thickness of the third lens element 130 is CT3, the following condition is satisfied: (Sag31−Sag32)/CT3=−0.92.

Figure 18:
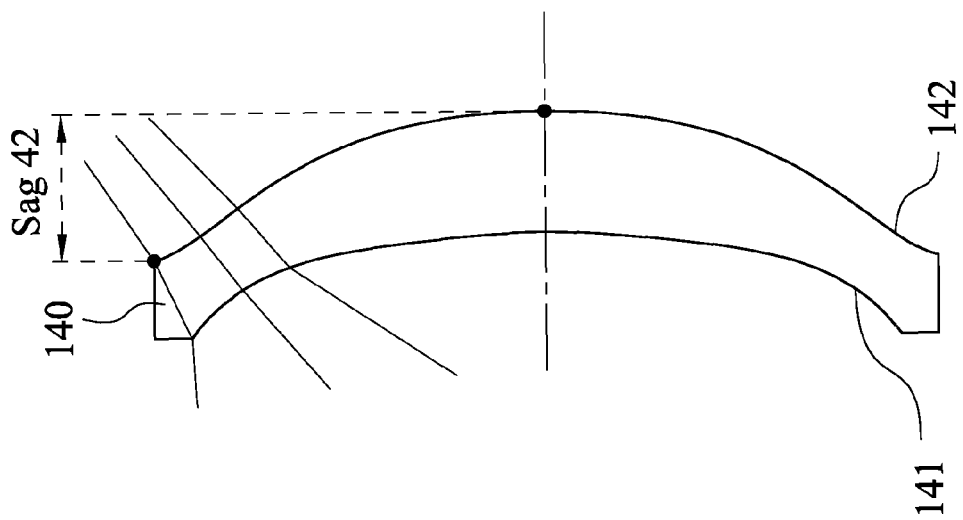
FIG. 18 shows a schematic view of the parameter Sag42 of a fourth lens element according to the 1st embodiment of FIG. 1.

FIG. 18 shows a schematic view of the parameter Sag42 of the fourth lens element 140 according to the 1st embodiment. In FIG. 18, when a distance in parallel with the optical axis from an axial vertex on the image-side surface 142 of the fourth lens element 140 to a maximum effective radius position on the image-side surface 142 of the fourth lens element 140 is Sag42, and a central thickness of the fourth lens element 140 is CT4, the following condition is satisfied: Sag42/CT4=−1.21.

In the optical photographing lens assembly according to the 1st embodiment, when a curvature radius of the object-side surface 121 of the second lens element 120 is R3, and a curvature radius of the image-side surface 122 of the second lens element 120 is R4, the following condition is satisfied: (R3+R4)/(R3−R4)=0.45.

In the optical photographing lens assembly according to the 1st embodiment, when a curvature radius of the object-side surface 131 of the third lens element 130 is R5, and a curvature radius of the image-side surface 132 of the third lens element 130 is R6, the following condition is satisfied: R5×R6=2.21 mm$^2$.

In the optical photographing lens assembly according to the 1st embodiment, when a focal length of the first lens element 110 is f1, and a focal length of the second lens element 120 is f2, the following condition is satisfied: |f2/f1|=0.72.

In the optical photographing lens assembly according to the 1st embodiment, when the focal length of the second lens element 120 is f2, a focal length of the third lens element 130 is f3, and a focal length of the fourth lens element 140 is f4, the following conditions are satisfied: |f2/f3|+|f2/f4|=1.19; and f4/f2=−6.71.

The detailed optical data of the 1st embodiment are shown in Table 1 and the aspheric surface data are shown in Table 2 below.

TABLE 1

1st Embodiment
f = 3.19 mm, Fno = 2.20, HFOV = 40.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.030 | | | | |
| 2 | Lens 1 | 2.970 ASP | 0.504 | Plastic | 1.544 | 55.9 | 4.39 |
| 3 | | −11.537 ASP | 0.109 | | | | |
| 4 | Lens 2 | 6.189 ASP | 0.513 | Plastic | 1.544 | 55.9 | 3.18 |
| 5 | | −2.334 ASP | 0.143 | | | | |
| 6 | Lens 3 | −0.995 ASP | 0.240 | Plastic | 1.639 | 23.5 | −3.06 |
| 7 | | −2.220 ASP | 0.445 | | | | |
| 8 | Lens 4 | −2.006 ASP | 0.389 | Plastic | 1.639 | 23.5 | −21.34 |
| 9 | | −2.530 ASP | 0.050 | | | | |
| 10 | Lens 5 | 1.277 ASP | 0.892 | Plastic | 1.639 | 23.5 | 9.14 |
| 11 | | 1.188 ASP | 0.600 | | | | |

TABLE 1-continued

1st Embodiment
f = 3.19 mm, Fno = 2.20, HFOV = 40.4 deg.

| Surface # | | Curvature Radius | Thickness | Material | Index | Abbe # | Focal Length |
|---|---|---|---|---|---|---|---|
| 12 | IR-cut filter | Plano | 0.300 | Glass | 1.517 | 64.2 | — |
| 13 | | Plano | 0.310 | | | | |
| 14 | Image | Plano | — | | | | |

Note:
Reference wavelength is 587.6 nm (d-line).

TABLE 2

Aspheric Coefficients

| Surface # | 2 | 3 | 4 | 5 | 6 |
|---|---|---|---|---|---|
| k = | −4.7907E+01 | −1.0000E+00 | −2.3452E+01 | −1.0000E+00 | −6.8502E+00 |
| A4 = | 1.0783E−01 | −3.0762E−01 | −1.8478E−01 | 6.0850E−02 | −1.0885E−01 |
| A6 = | −4.3640E−01 | −5.0589E−02 | −1.9062E−01 | −4.2386E−01 | −1.4262E−03 |
| A8 = | 3.2888E−01 | 1.5386E−01 | 6.0069E−01 | 4.6846E−01 | −1.6698E−01 |
| A10 = | −2.5545E−01 | −1.6480E−01 | −7.7492E−01 | −3.6023E−01 | 3.8505E−01 |
| A12 = | −2.8005E−02 | 1.7647E−01 | 7.6303E−01 | 2.9848E−01 | −1.5691E−01 |
| A14 = | −7.8813E−02 | −2.0106E−01 | −4.0751E−01 | −1.2565E−01 | |

| Surface # | 7 | 8 | 9 | 10 | 11 |
|---|---|---|---|---|---|
| k = | −5.0000E+01 | −6.1899E+01 | 1.1216E+00 | −1.3166E+01 | −3.8790E+00 |
| A4 = | 9.1871E−02 | 1.5025E−02 | −1.9372E−01 | −1.7433E−01 | −1.2789E−01 |
| A6 = | −1.4970E−01 | −1.0523E−01 | 2.0764E−01 | −8.4122E−02 | 5.7388E−02 |
| A8 = | 1.0552E−01 | −1.0573E−01 | −1.8852E−01 | 1.6115E−01 | −1.8579E−02 |
| A10 = | −5.2244E−02 | 2.2074E−01 | 7.5487E−02 | −8.3709E−02 | 3.7099E−03 |
| A12 = | 1.6110E−02 | −1.5772E−01 | 1.1125E−02 | 2.0410E−02 | −4.1697E−04 |
| A14 = | | 3.7084E−02 | −7.2728E−03 | −2.2683E−03 | 1.8835E−05 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A14 represent the aspheric coefficients ranging from the 4th order to the 14th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
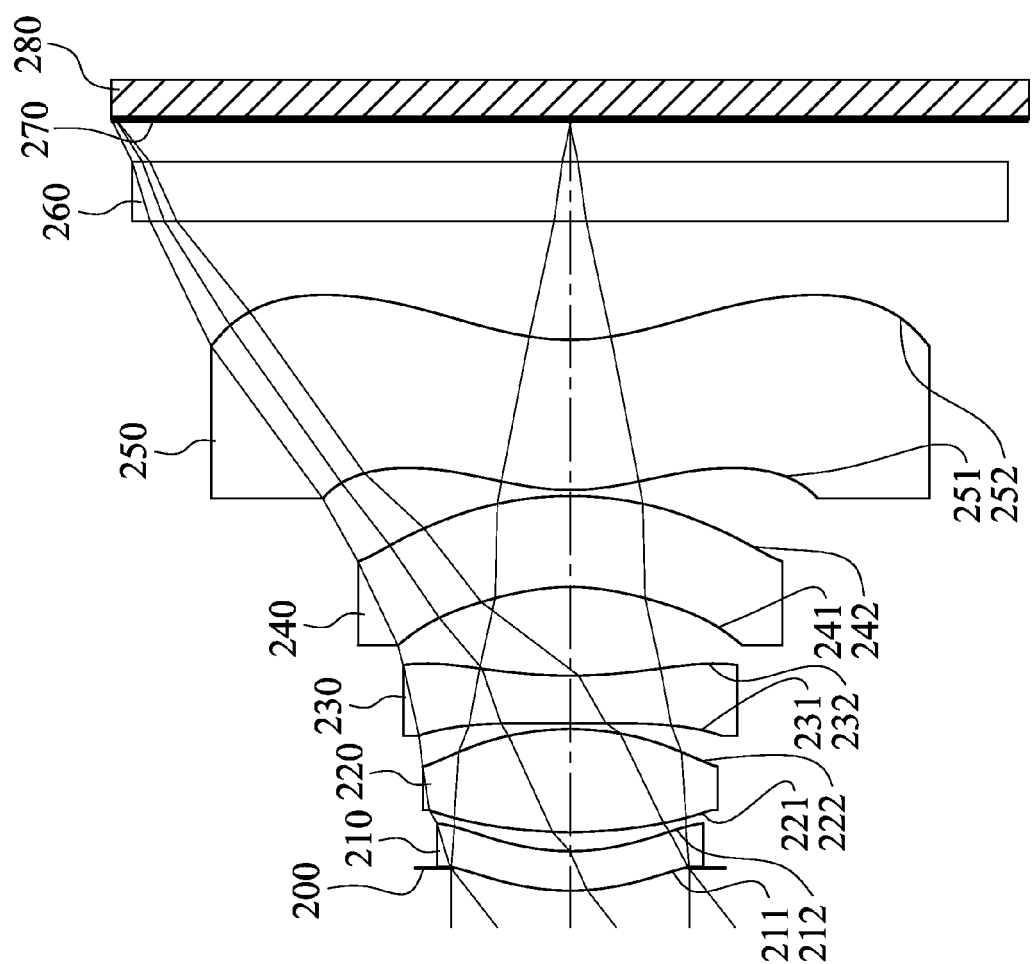
FIG. 3 is a schematic view of an image capturing apparatus according to the 2nd embodiment of the present disclosure.
Figure 4:
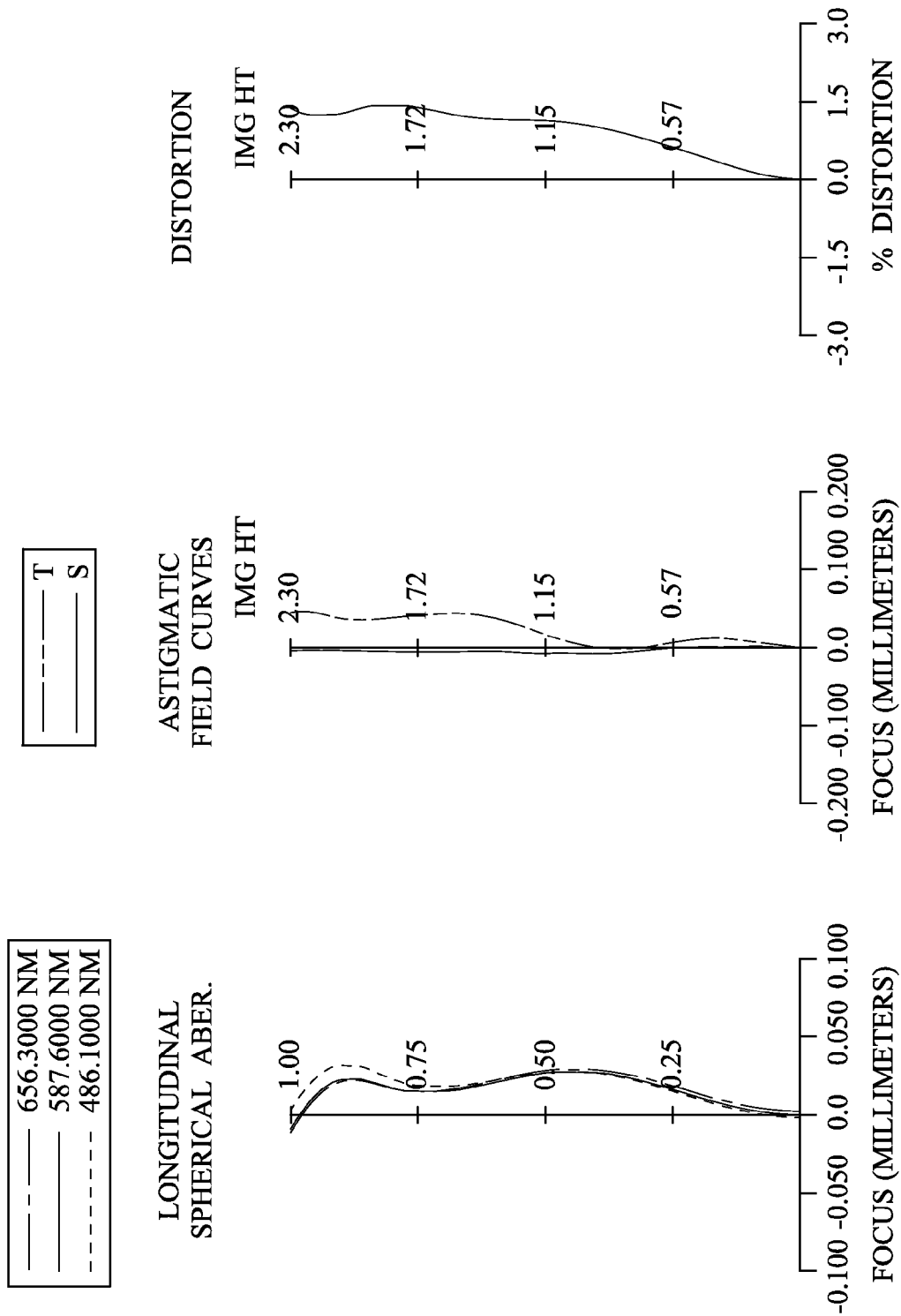
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows spherical aberration curves, astigmatic field curves and a distortion curve of the image capturing apparatus according to the 2nd embodiment. In FIG. 3, the image capturing apparatus includes an optical photographing lens assembly (its reference numeral is omitted) and an image sensor 280. The optical photographing lens assembly includes, in order from an object side to an image side, an aperture stop 200, a first lens element 210, a second lens element 220, a third lens element 230, a fourth lens element 240, a fifth lens element 250, an IR-cut filter 260 and an image surface 270, wherein the image sensor 280 is disposed on the image surface 270 of the optical photographing lens assembly. The optical photographing lens assembly has a total of five lens elements (210-250) with refractive power. There is an axial distance in a paraxial region between every two of the first lens element 210, the second lens element 220, the third lens element 230, the fourth lens element 240 and the fifth lens element 250 that are adjacent to each other.

The first lens element 210 with positive refractive power has an object-side surface 211 being convex in a paraxial region thereof and an image-side surface 212 being concave in a paraxial region thereof. The first lens element 210 is made of plastic material, and has the object-side surface 211 and the image-side surface 212 being both aspheric. Furthermore, the image-side surface 212 of the first lens element 210 includes at least one convex shape in an off-axial region thereof, and the object-side surface 211 and the image-side surface 212 of the first lens element 210 both include at least one inflection point.

The second lens element 220 with positive refractive power has an object-side surface 221 being convex in a paraxial region thereof and an image-side surface 222 being convex in a paraxial region thereof. The second lens element 220 is made of plastic material, and has the object-side surface 221 and the image-side surface 222 being both aspheric. Furthermore, the image-side surface 222 of the second lens element 220 includes at least one inflection point.

The third lens element 230 with negative refractive power has an object-side surface 231 being convex in a paraxial region thereof and an image-side surface 232 being concave in a paraxial region thereof. The third lens element 230 is made of plastic material, and has the object-side surface 231 and the image-side surface 232 being both aspheric. Furthermore, the object-side surface 231 and the image-side surface 232 of the third lens element 230 both include at least one inflection point.

The fourth lens element 240 with negative refractive power has an object-side surface 241 being concave in a paraxial region thereof and an image-side surface 242 being convex in a paraxial region thereof. The fourth lens element 240 is made of plastic material, and has the object-side surface 241 and the image-side surface 242 being both aspheric. Furthermore, the image-side surface 242 of the fourth lens element 240 includes at least one inflection point.

The fifth lens element 250 with positive refractive power has an object-side surface 251 being convex in a paraxial region thereof and an image-side surface 252 being concave in a paraxial region thereof. The fifth lens element 250 is made of plastic material, and has the object-side surface 251 and the image-side surface 252 being both aspheric. Furthermore, the image-side surface 252 of the fifth lens element 250 includes at least one convex shape in an off-axial region thereof.

The IR-cut filter 260 is made of glass material and located between the fifth lens element 250 and the image surface 270, and will not affect a focal length of the optical photographing lens assembly.

The detailed optical data of the 2nd embodiment are shown in Table 3 and the aspheric surface data are shown in Table 4 below.

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.88 | (Sag31 − Sag32)/CT3 | −0.49 |
| Fno | 2.40 | Sag42/CT4 | −0.72 |
| HFOV [deg.] | 38.0 | (R3 + R4)/(R3 − R4) | 0.21 |
| V3/V4 | 1.00 | R5 × R6 [mm$^2$] | 318.61 |
| V4 | 23.5 | |f2/f1| | 0.02 |

TABLE 3

2nd Embodiment
f = 2.88 mm, Fno = 2.40, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.113 | | | | |
| 2 | Lens 1 | 1.201 | ASP | 0.200 | Plastic | 1.639 | 23.5 | 96.10 |
| 3 | | 1.145 | ASP | 0.096 | | | | |
| 4 | Lens 2 | 2.261 | ASP | 0.521 | Plastic | 1.544 | 55.9 | 1.73 |
| 5 | | −1.481 | ASP | 0.030 | | | | |
| 6 | Lens 3 | 128.439 | ASP | 0.240 | Plastic | 1.639 | 23.5 | −3.96 |
| 7 | | 2.481 | ASP | 0.449 | | | | |
| 8 | Lens 4 | −1.081 | ASP | 0.460 | Plastic | 1.639 | 23.5 | −5.80 |
| 9 | | −1.780 | ASP | 0.030 | | | | |
| 10 | Lens 5 | 1.157 | ASP | 0.759 | Plastic | 1.544 | 55.9 | 7.29 |
| 11 | | 1.256 | ASP | 0.600 | | | | |
| 12 | IR-cut filter | Plano | | 0.300 | Glass | 1.517 | 64.2 | |
| 13 | | Plano | | 0.216 | | | | |
| 14 | Image | Plano | | — | | | | |

Note:
Reference wavelength is 587.6 nm (d-line).

TABLE 4

| Aspheric Coefficients | | | | | |
|---|---|---|---|---|---|
| Surface # | 2 | 3 | 4 | 5 | 6 |
| k = | −3.2865E+00 | −3.1534E+00 | −2.8725E+01 | −4.9550E+00 | −9.0000E+01 |
| A4 = | 2.4356E−02 | 1.0301E−02 | 1.5368E−01 | −2.8482E−01 | −1.8494E−01 |
| A6 = | 4.0539E−02 | 7.6565E−02 | −1.3089E−01 | 5.8600E−01 | 9.9357E−03 |
| A8 = | −1.4487E+00 | −1.0913E+00 | 7.1136E−02 | −4.4498E+00 | 2.0680E−01 |
| A10 = | 1.8998E+00 | 5.7536E−01 | 2.4317E−01 | 2.5503E+01 | −1.1418E+00 |
| A12 = | −2.0658E+00 | −5.8373E−01 | 4.8181E−01 | −7.6148E+01 | 2.0980E+00 |
| A14 = | | | −8.9488E−01 | 1.1238E+02 | −1.5004E+00 |
| A16 = | | | | −6.2644E+01 | |

| Surface # | 7 | 8 | 9 | 10 | 11 |
|---|---|---|---|---|---|
| k = | −7.0093E+00 | −1.2092E+01 | −1.1679E+00 | −1.0184E+01 | −1.1020E+00 |
| A4 = | −5.4062E−02 | −3.9329E−01 | −1.2398E−01 | −3.6802E−02 | −2.5288E−01 |
| A6 = | −2.2308E−02 | 2.4059E+00 | 5.9533E−01 | −3.6827E−01 | 7.1803E−02 |
| A8 = | −5.1237E−01 | −1.2621E+01 | −2.5276E+00 | 4.0428E−01 | 6.6063E−03 |
| A10 = | 8.7748E−01 | 3.9980E+01 | 6.1450E+00 | 2.2169E−02 | −1.2670E−02 |
| A12 = | −6.3588E−01 | −7.3131E+01 | −7.8188E+00 | −3.0902E−01 | 3.3658E−03 |
| A14 = | 1.9554E−01 | 6.8489E+01 | 4.8879E+00 | 1.9448E−01 | −2.7585E−04 |
| A16 = | | −2.5231E+01 | −1.1801E+00 | −3.9254E−02 | −7.8003E−06 |

-continued

| 2nd Embodiment | | | |
|---|---|---|---|
| CT1/CT2 | 0.38 | \|f2/f3\| + \|f2/f4\| | 0.74 |
| ATmax/(ΣAT − ATmax) | 2.88 | f4/f2 | −3.35 |
| ΣAT/f | 0.21 | | |

3rd Embodiment

Figure 5:
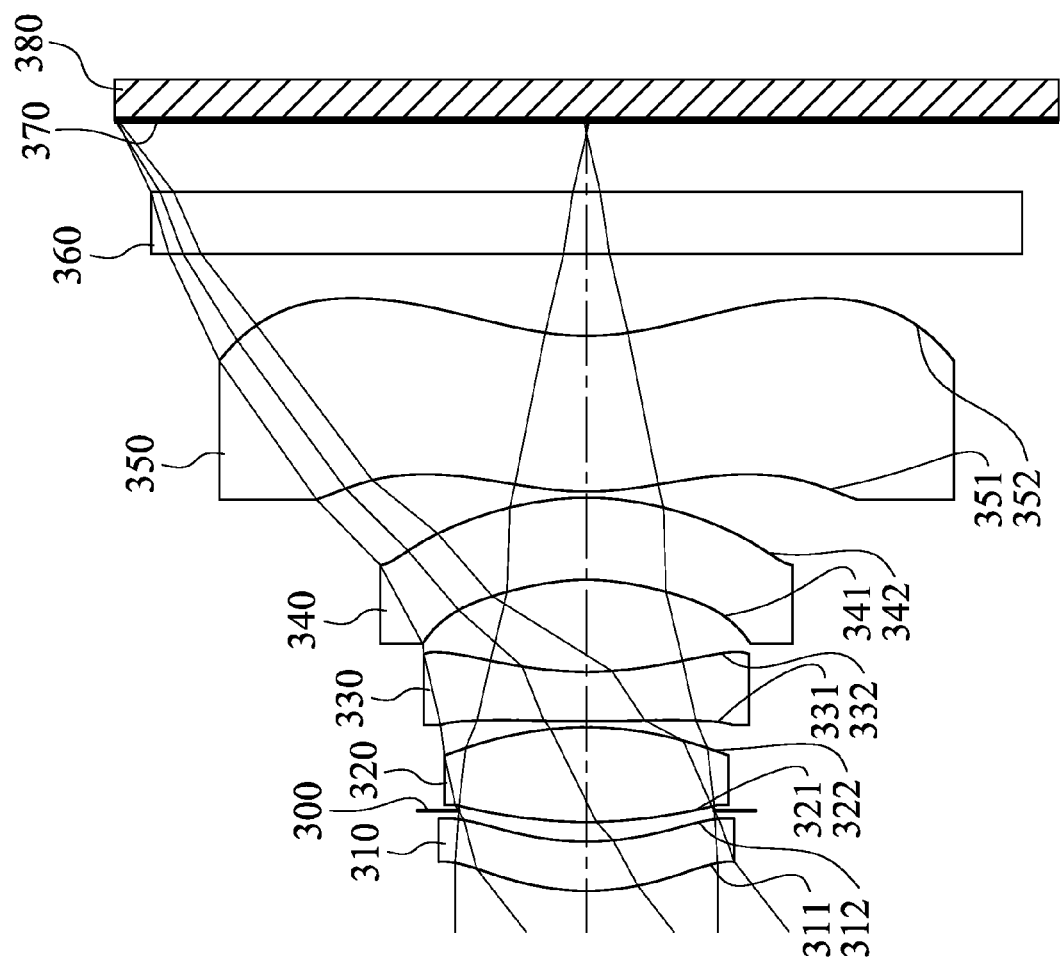
FIG. 5 is a schematic view of an image capturing apparatus according to the 3rd embodiment of the present disclosure.
Figure 6:
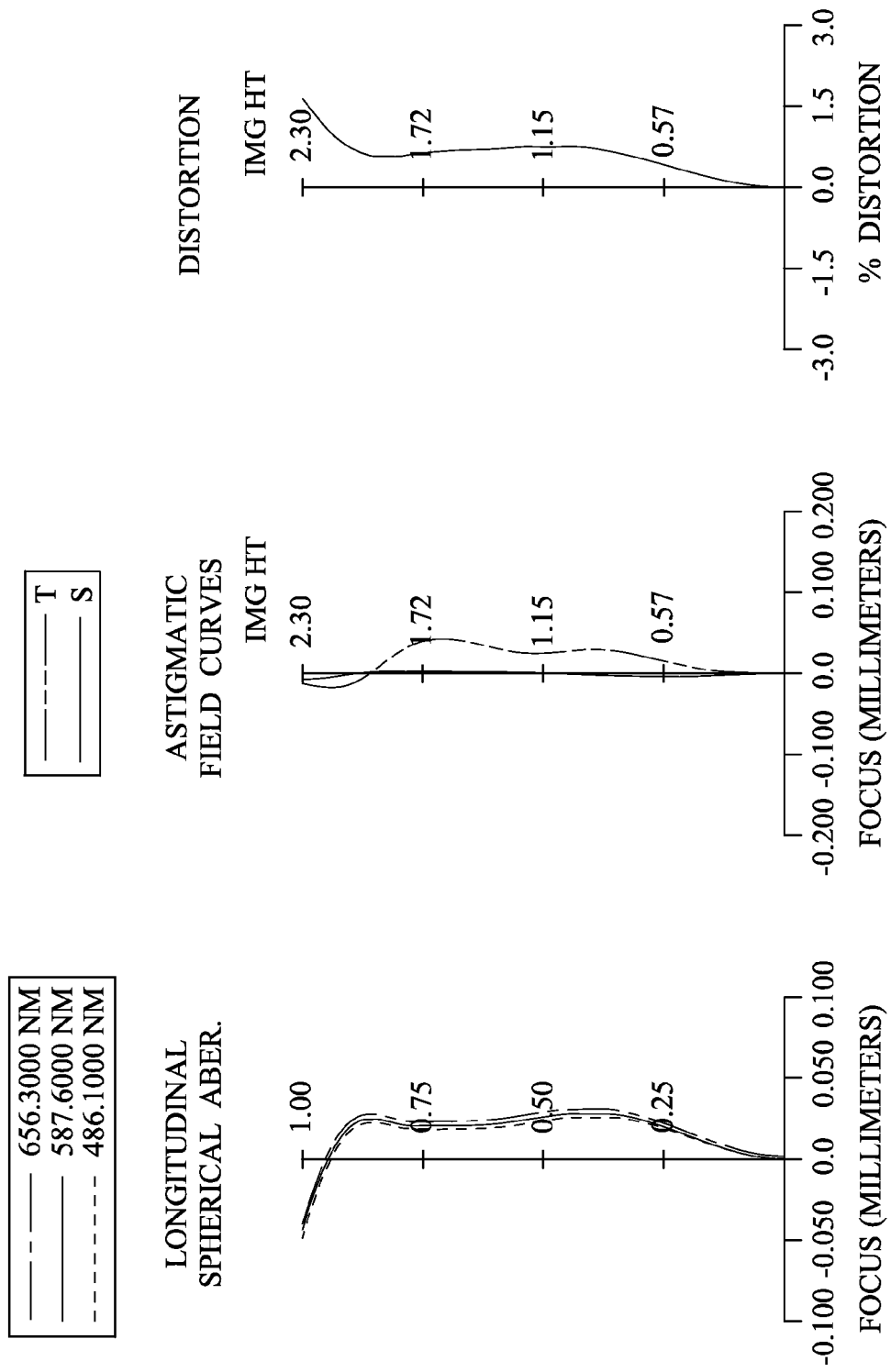
FIG. 6 shows spherical aberration curves, astigmatic field curves and a distortion curve of the image capturing apparatus according to the 3rd embodiment.

FIG. 5 is a schematic view of an image capturing apparatus according to the 3rd embodiment of the present disclosure. FIG. 6 shows spherical aberration curves, astigmatic field curves and a distortion curve of the image capturing apparatus according to the 3rd embodiment. In FIG. 5, the image capturing apparatus includes an optical photographing lens assembly (its reference numeral is omitted) and an image sensor 380. The optical photographing lens assembly includes, in order from an object side to an image side, a first lens element 310, an aperture stop 300, a second lens element 320, a third lens element 330, a fourth lens element 340, a fifth lens element 350, an IR-cut filter 360 and an image surface 370, wherein the image sensor 380 is disposed on the image surface 370 of the optical photographing lens assembly. The optical photographing lens assembly has a total of five lens elements (310-350) with refractive power. There is an axial distance in a paraxial region between every two of the first lens element 310, the second lens element 320, the third lens element 330, the fourth lens element 340 and the fifth lens element 350 that are adjacent to each other.

The first lens element 310 with positive refractive power has an object-side surface 311 being convex in a paraxial region thereof and an image-side surface 312 being concave in a paraxial region thereof. The first lens element 310 is made of plastic material, and has the object-side surface 311 and the image-side surface 312 being both aspheric. Furthermore, the image-side surface 312 of the first lens element 310 includes at least one convex shape in an off-axial region thereof, and the object-side surface 311 and the image-side surface 312 of the first lens element 310 both include at least one inflection point.

The second lens element 320 with positive refractive power has an object-side surface 321 being convex in a paraxial region thereof and an image-side surface 322 being convex in a paraxial region thereof. The second lens element 320 is made of plastic material, and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of plastic material, and has the object-side surface 331 and the image-side surface 332 being both aspheric. Furthermore, the object-side surface 331 and the image-side surface 332 of the third lens element 330 both include at least one inflection point.

The fourth lens element 340 with negative refractive power has an object-side surface 341 being concave in a paraxial region thereof and an image-side surface 342 being convex in a paraxial region thereof. The fourth lens element 340 is made of plastic material, and has the object-side surface 341 and the image-side surface 342 being both aspheric. Furthermore, the image-side surface 342 of the fourth lens element 340 includes at least one inflection point.

The fifth lens element 350 with positive refractive power has an object-side surface 351 being convex in a paraxial region thereof and an image-side surface 352 being concave in a paraxial region thereof. The fifth lens element 350 is made of plastic material, and has the object-side surface 351 and the image-side surface 352 being both aspheric. Furthermore, the image-side surface 352 of the fifth lens element 350 includes at least one convex shape in an off-axial region thereof.

The IR-cut filter 360 is made of glass material and located between the fifth lens element 350 and the image surface 370, and will not affect a focal length of the optical photographing lens assembly.

The detailed optical data of the 3rd embodiment are shown in Table 5 and the aspheric surface data are shown in Table 6 below.

TABLE 5

3rd Embodiment
f = 2.88 mm, Fno = 2.25, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.201 | ASP | 0.240 | Plastic | 1.530 | 55.8 | 13.55 |
| 2 | | 1.342 | ASP | 0.150 | | | | |
| 3 | Ape. Stop | Plano | | −0.054 | | | | |
| 4 | Lens 2 | 2.306 | ASP | 0.462 | Plastic | 1.544 | 55.9 | 1.81 |
| 5 | | −1.600 | ASP | 0.030 | | | | |
| 6 | Lens 3 | 17.328 | ASP | 0.240 | Plastic | 1.639 | 23.5 | −3.25 |
| 7 | | 1.844 | ASP | 0.449 | | | | |
| 8 | Lens 4 | −1.081 | ASP | 0.400 | Plastic | 1.639 | 23.5 | −16.42 |
| 9 | | −1.379 | ASP | 0.030 | | | | |
| 10 | Lens 5 | 1.502 | ASP | 0.759 | Plastic | 1.544 | 55.9 | 45.31 |
| 11 | | 1.315 | ASP | 0.400 | | | | |
| 12 | IR-cut filter | Plano | | 0.300 | Glass | 1.517 | 64.2 | — |
| 13 | | Plano | | 0.352 | | | | |
| 14 | Image | Plano | | — | | | | |

Note:
Reference wavelength is 587.6 nm (d-line).

TABLE 6

Aspheric Coefficients

| Surface # | 1 | 2 | 4 | 5 | 6 |
|---|---|---|---|---|---|
| k = | −2.5931E+00 | −3.1893E+00 | −2.5532E+01 | −5.0474E+00 | −9.0000E+01 |
| A4 = | 2.4356E−02 | 8.3715E−03 | 1.7228E−01 | 4.3431E−01 | 4.0162E−01 |
| A6 = | 7.7468E−02 | −3.8261E−02 | −2.1180E−01 | −5.5181E+00 | −4.5272E+00 |
| A8 = | −1.4238E+00 | −1.1011E+00 | −1.1853E+00 | 3.0400E+01 | 1.9235E+01 |
| A10 = | 1.9670E+00 | 7.6918E−01 | 5.1099E−01 | −1.0474E+02 | −4.7427E+01 |
| A12 = | −1.9555E+00 | −5.8373E−01 | 4.8181E−01 | 2.2714E+02 | 6.6729E+01 |
| A14 = | | | −8.9488E−01 | −2.7473E+02 | −4.2140E+01 |
| A16 = | | | | 1.3848E+02 | |

| Surface # | 7 | 8 | 9 | 10 | 11 |
|---|---|---|---|---|---|
| k = | −7.0093E+00 | −1.2510E+01 | −6.4835E+00 | −1.1008E+01 | −3.7894E+00 |
| A4 = | 1.4677E−01 | −3.7874E−01 | −4.0073E−02 | −4.0778E−02 | −1.6749E−01 |
| A6 = | −1.0666E+00 | 2.0060E+00 | −2.0427E−01 | −6.5872E−01 | 5.9897E−02 |
| A8 = | 2.6429E+00 | −9.7401E+00 | −5.3783E−01 | 1.4767E+00 | 5.5375E−03 |
| A10 = | −4.4116E+00 | 2.5897E+01 | 3.7583E+00 | −1.5820E+00 | −1.8117E−02 |
| A12 = | 4.9710E+00 | −3.9505E+01 | −7.0984E+00 | 8.9912E−01 | 7.4703E−03 |
| A14 = | −3.3978E+00 | 2.6227E+01 | 5.5516E+00 | −2.5894E−01 | −1.3327E−03 |
| A16 = | | −3.8682E+00 | −1.5140E+00 | 2.9848E−02 | 8.9883E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.88 | (Sag31 − Sag32)/CT3 | −0.44 |
| Fno | 2.25 | Sag42/CT4 | −0.82 |
| HFOV [deg.] | 38.0 | (R3 + R4)/(R3 − R4) | 0.18 |
| V3/V4 | 1.00 | R5 × R6 [mm$^2$] | 31.95 |
| V4 | 23.5 | \|f2/f1\| | 0.13 |
| CT1/CT2 | 0.52 | \|f2/f3\| + \|f2/f4\| | 0.67 |
| ATmax/(ΣAT − ATmax) | 2.88 | f4/f2 | −9.07 |
| ΣAT/f | 0.21 | | |

4th Embodiment

Figure 7:
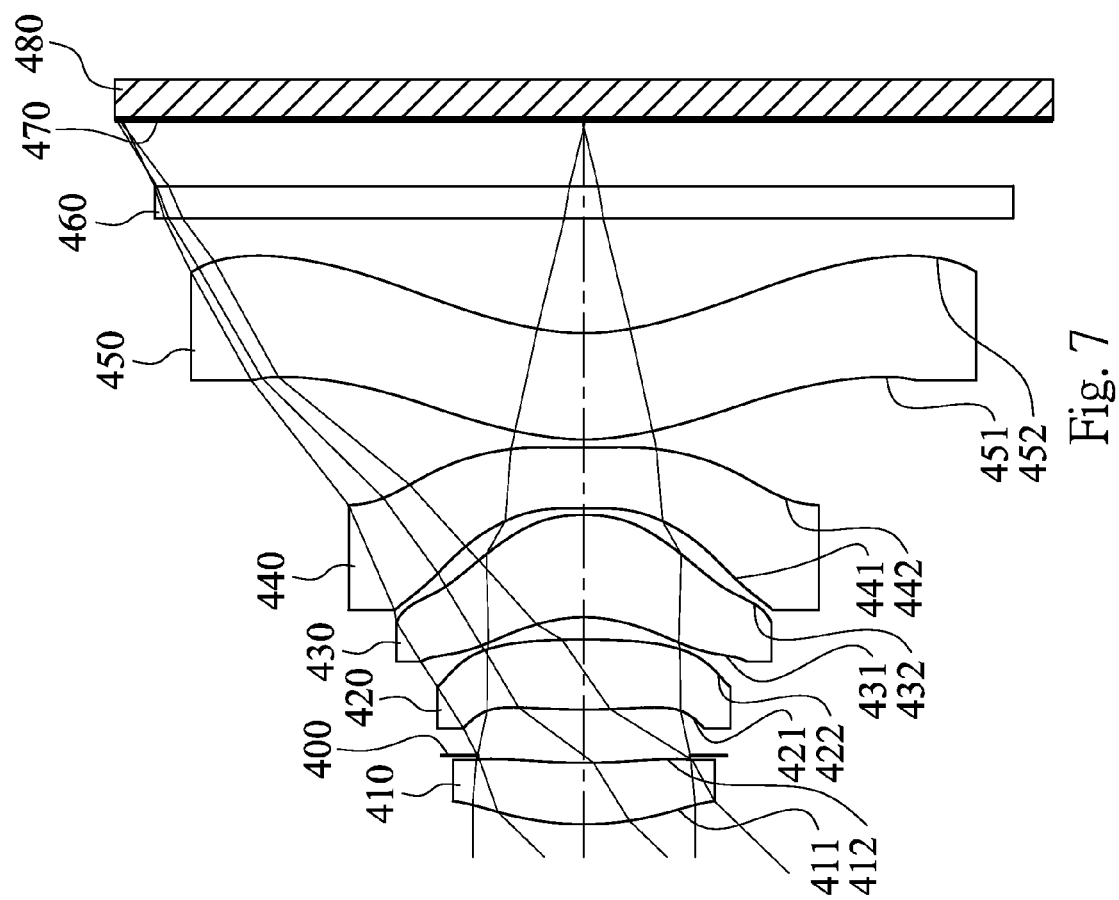
FIG. 7 is a schematic view of an image capturing apparatus according to the 4th embodiment of the present disclosure.
Figure 8:
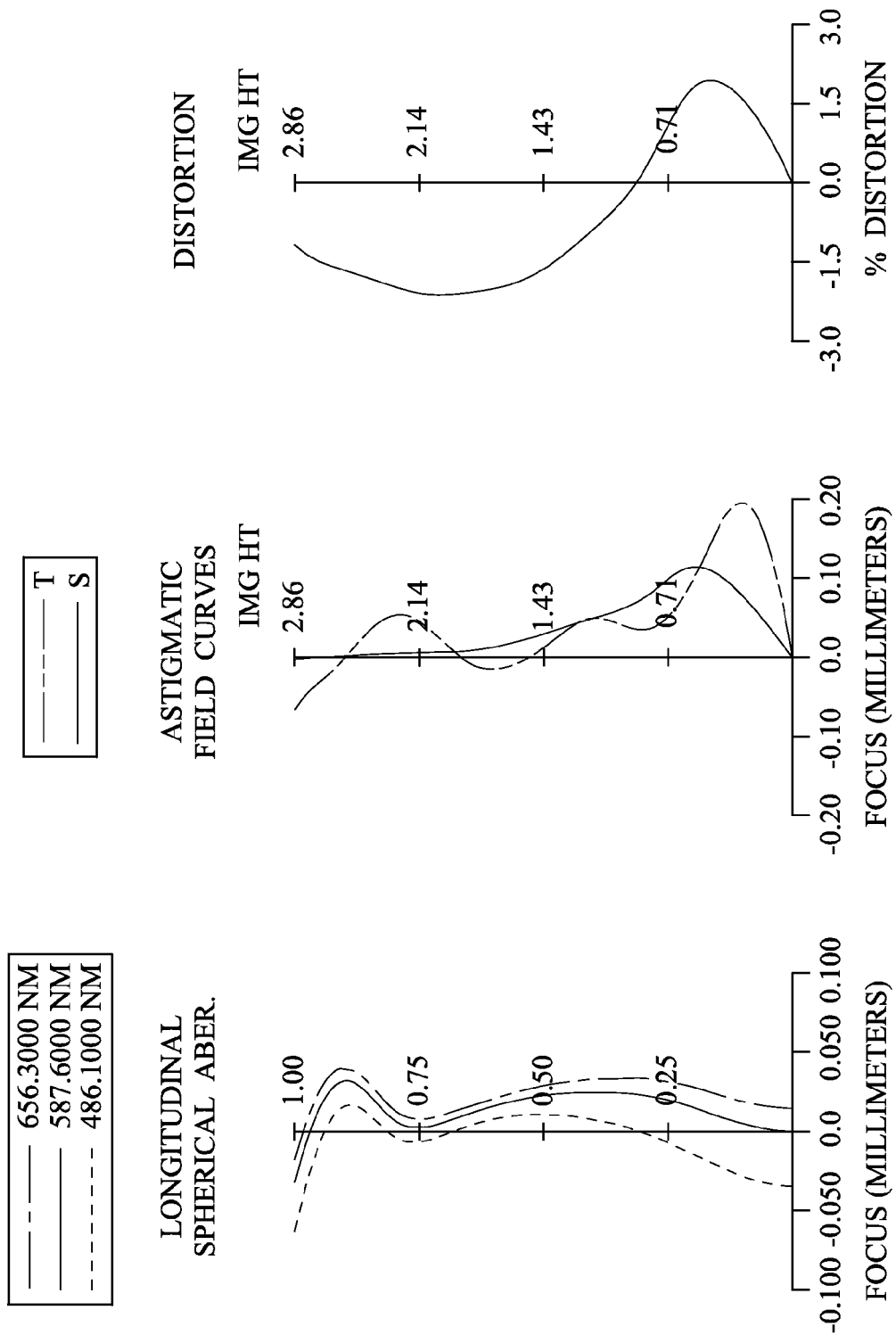
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows spherical aberration curves, astigmatic field curves and a distortion curve of the image capturing apparatus according to the 4th embodiment. In FIG. 7, the image capturing apparatus includes an optical photographing lens assembly (its reference numeral is omitted) and an image sensor 480. The optical photographing lens assembly includes, in order from an object side to an image side, a first lens element 410, an aperture stop 400, a second lens element 420, a third lens element 430, a fourth lens element 440, a fifth lens element 450, an IR-cut filter 460 and an image surface 470, wherein the image sensor 480 is disposed on the image surface 470 of the optical photographing lens assembly. The optical photographing lens assembly has a total of five lens elements (410-450) with refractive power. There is an axial distance in a paraxial region between every two of the first lens element 410, the second lens element 420, the third lens element 430, the fourth lens element 440 and the fifth lens element 450 that are adjacent to each other.

The first lens element 410 with positive refractive power has an object-side surface 411 being convex in a paraxial region thereof and an image-side surface 412 being concave in a paraxial region thereof. The first lens element 410 is made of plastic material, and has the object-side surface 411 and the image-side surface 412 being both aspheric. Furthermore, the image-side surface 412 of the first lens element 410 includes at least one convex shape in an off-axial region thereof, and the object-side surface 411 and the image-side surface 412 of the first lens element 410 both include at least one inflection point.

The second lens element 420 with positive refractive power has an object-side surface 421 being convex in a paraxial region thereof and an image-side surface 422 being convex in a paraxial region thereof. The second lens element 420 is made of plastic material, and has the object-side surface 421 and the image-side surface 422 being both aspheric. Furthermore, the object-side surface 421 of the second lens element 420 includes at least one concave shape in an off-axial region thereof, and the object-side surface 421 and the image-side surface 422 of the second lens element 420 both include at least one inflection point.

The third lens element 430 with negative refractive power has an object-side surface 431 being concave in a paraxial region thereof and an image-side surface 432 being convex in a paraxial region thereof. The third lens element 430 is made of plastic material, and has the object-side surface 431 and the image-side surface 432 being both aspheric. Furthermore, the object-side surface 431 and the image-side surface 432 of the third lens element 430 both include at least one inflection point.

The fourth lens element 440 with negative refractive power has an object-side surface 441 being convex in a paraxial region thereof and an image-side surface 442 being concave in a paraxial region thereof. The fourth lens element 440 is made of plastic material, and has the object-side surface 441 and the image-side surface 442 being both aspheric. Furthermore, the object-side surface 441 and the image-side surface 442 of the fourth lens element 440 both include at least one inflection point.

The fifth lens element 450 with positive refractive power has an object-side surface 451 being convex in a paraxial region thereof and an image-side surface 452 being concave in a paraxial region thereof. The fifth lens element 450 is made of plastic material, and has the object-side surface 451 and the image-side surface 452 being both aspheric. Furthermore, the image-side surface 452 of the fifth lens element 450 includes at least one convex shape in an off-axial region thereof.

The IR-cut filter 460 is made of glass material and located between the fifth lens element 450 and the image surface 470, and will not affect a focal length of the optical photographing lens assembly.

The detailed optical data of the 4th embodiment are shown in Table 7 and the aspheric surface data are shown in Table 8 below.

TABLE 7

4th Embodiment
f = 2.79 mm, Fno = 2.05, HFOV = 45.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.797 | ASP | 0.376 | Plastic | 1.544 | 55.9 | 5.88 |
| 2 | | 3.795 | ASP | 0.044 | | | | |
| 3 | Ape. Stop | Plano | | 0.281 | | | | |
| 4 | Lens 2 | 4.135 | ASP | 0.430 | Plastic | 1.544 | 55.9 | 4.02 |
| 5 | | -4.477 | ASP | 0.135 | | | | |
| 6 | Lens 3 | -0.943 | ASP | 0.626 | Plastic | 1.544 | 55.9 | -27.61 |
| 7 | | -1.241 | ASP | 0.040 | | | | |
| 8 | Lens 4 | 9.697 | ASP | 0.371 | Plastic | 1.639 | 23.5 | -14.01 |
| 9 | | 4.585 | ASP | 0.050 | | | | |
| 10 | Lens 5 | 1.336 | ASP | 0.650 | Plastic | 1.639 | 23.5 | 9.04 |
| 11 | | 1.407 | ASP | 0.700 | | | | |
| 12 | IR-cut filter | Plano | | 0.200 | Glass | 1.517 | 64.2 | — |
| 13 | | Plano | | 0.405 | | | | |
| 14 | Image | Plano | | — | | | | |

Note:
Reference wavelength is 587.6 nm (d-line).
The effective radius of the surface 1 is 0.800 mm.

TABLE 8

Aspheric Coefficients

| Surface # | 1 | 2 | 4 | 5 | 6 |
|---|---|---|---|---|---|
| k = | 9.8616E-01 | 1.0000E+00 | 5.0000E+00 | -1.1413E+01 | -6.1161E+00 |
| A4 = | -1.1330E-02 | -1.3834E-01 | -8.7731E-02 | 4.3373E-02 | -3.4752E-01 |
| A6 = | -1.6612E-01 | -3.1947E-01 | -1.6465E+00 | -2.1073E+00 | -7.0127E-01 |
| A8 = | -9.7745E-01 | 4.3708E+00 | 8.6125E+00 | 1.0357E+01 | 6.5008E+00 |
| A10 = | 7.0109E+00 | -3.1066E+01 | -3.8862E+01 | -3.1763E+01 | -1.2832E+01 |
| A12 = | -1.9168E+01 | 9.8574E+01 | 9.7613E+01 | 5.5495E+01 | 1.1965E+01 |
| A14 = | 2.3054E+01 | -1.5142E+02 | -1.5035E+02 | -5.2869E+01 | -5.5885E+00 |
| A16 = | -1.0562E+01 | 9.1587E+01 | 1.0362E+02 | 2.1152E+01 | 1.0259E+00 |

| Surface # | 7 | 8 | 9 | 10 | 11 |
|---|---|---|---|---|---|
| k = | -3.9859E-01 | -1.0000E+00 | -1.0000E+01 | -2.3828E+01 | -1.0735E+01 |
| A4 = | -3.0266E+00 | -3.5553E+00 | -1.1414E+01 | 1.7768E-01 | 7.7226E-02 |
| A6 = | 1.4216E+01 | 1.2840E+01 | 2.5750E+00 | -1.7138E-01 | -5.9657E-02 |
| A8 = | -3.6008E+01 | -2.7088E+01 | -3.5668E+00 | 7.5002E-02 | 1.9375E-02 |
| A10 = | 5.3665E+01 | 3.2576E+01 | 2.8468E+00 | -1.8137E-02 | -3.4569E-03 |
| A12 = | -4.5518E+01 | -2.1998E+01 | -1.2761E+00 | 2.3567E-03 | 3.2765E-04 |
| A14 = | 2.0338E+01 | 7.8304E+00 | 3.0190E-01 | -1.3132E-04 | -1.3322E-05 |
| A16 = | -3.7356E+00 | -1.1550E+00 | -2.9580E-02 | | |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.79 | (Sag31 − Sag32)/CT3 | 0.61 |
| Fno | 2.05 | Sag42/CT4 | -0.95 |
| HFOV [deg.] | 45.9 | (R3 + R4)/(R3 − R4) | -0.04 |
| V3/V4 | 2.38 | R5 × R6 [mm²] | 1.17 |
| V4 | 23.5 | |f2/f1| | 0.68 |

-continued

| 4th Embodiment | | | |
|---|---|---|---|
| CT1/CT2 | 0.87 | |f2/f3| + |f2/f4| | 0.43 |
| ATmax/(ΣAT − ATmax) | 1.44 | f4/f2 | -3.49 |
| ΣAT/f | 0.20 | | |

5th Embodiment

Figure 9:
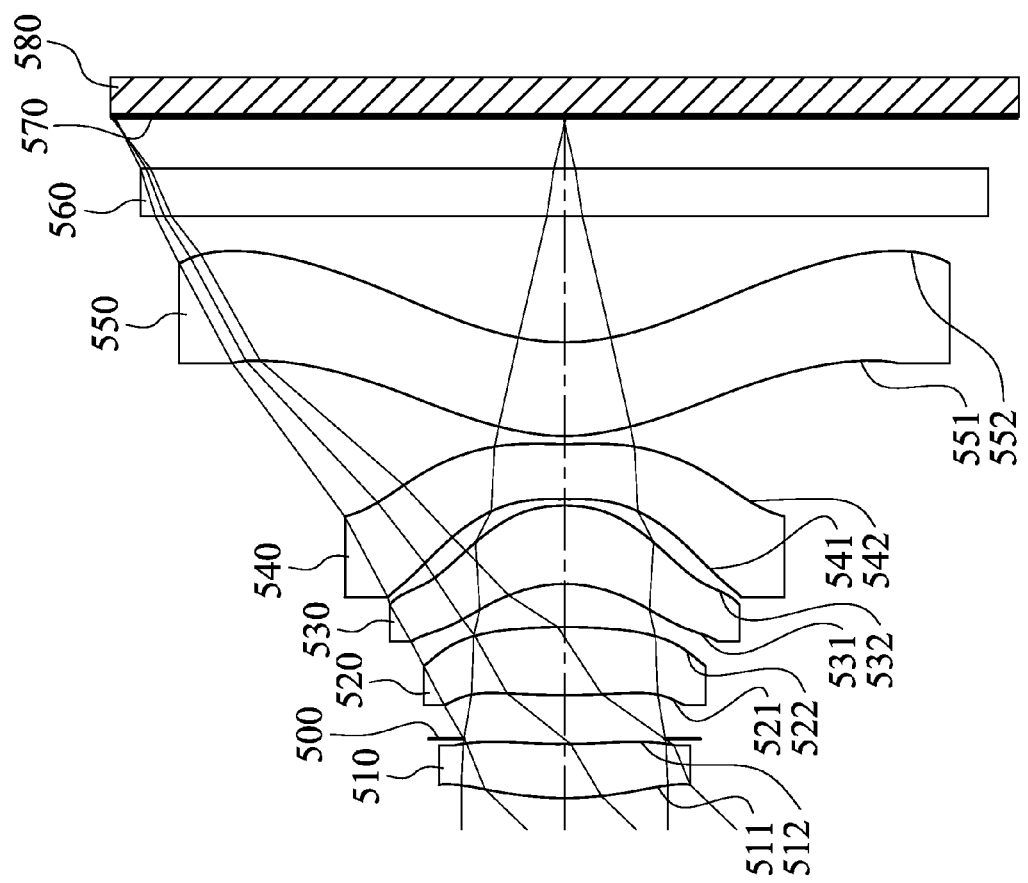
FIG. 9 is a schematic view of an image capturing apparatus according to the 5th embodiment of the present disclosure.
Figure 10:
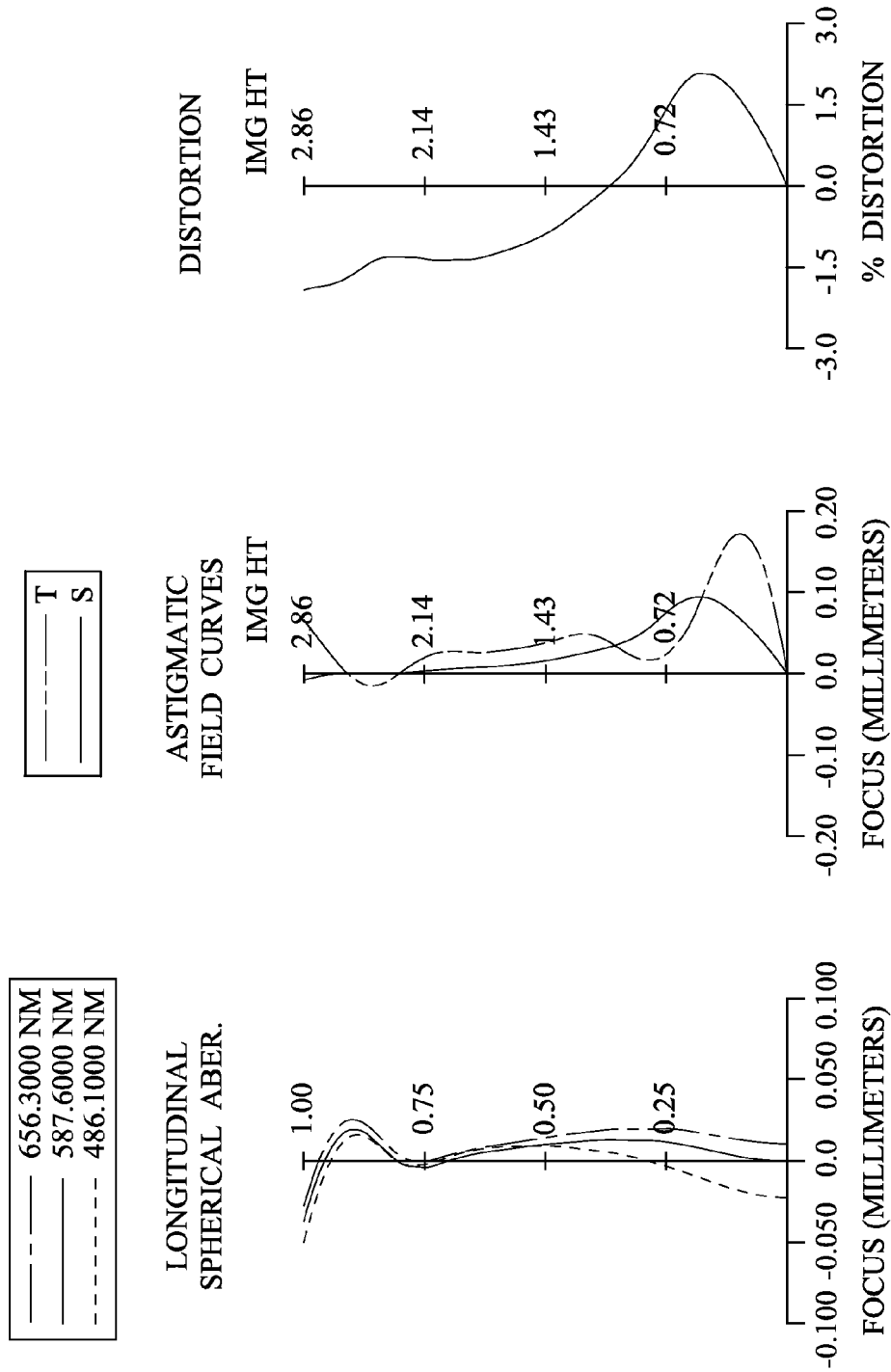
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows spherical aberration curves, astigmatic field curves and a distortion curve of the image capturing apparatus according to the 5th embodiment. In FIG. 9, the image capturing apparatus includes an optical photographing lens assembly (its reference numeral is omitted) and an image sensor 580. The optical photographing lens assembly includes, in order from an object side to an image side, a first lens element 510, an aperture stop 500, a second lens element 520, a third lens element 530, a fourth lens element 540, a fifth lens element 550, an IR-cut filter 560 and an image surface 570, wherein the image sensor 580 is disposed on the image surface 570 of the optical photographing lens assembly. The optical photographing lens assembly has a total of five lens elements (510-550) with refractive power. There is an axial distance in a paraxial region between every two of the first lens element 510, the second lens element 520, the third lens element 530, the fourth lens element 540 and the fifth lens element 550 that are adjacent to each other.

The first lens element 510 with positive refractive power has an object-side surface 511 being convex in a paraxial region thereof and an image-side surface 512 being concave in a paraxial region thereof. The first lens element 510 is made of glass material, and has the object-side surface 511 and the image-side surface 512 being both aspheric. Furthermore, the image-side surface 512 of the first lens element 510 includes at least one convex shape in an off-axial region thereof, and the object-side surface 511 and the image-side surface 512 of the first lens element 510 both include at least one inflection point.

The second lens element 520 with positive refractive power has an object-side surface 521 being convex in a paraxial region thereof and an image-side surface 522 being convex in a paraxial region thereof. The second lens element 520 is made of plastic material, and has the object-side surface 521 and the image-side surface 522 being both aspheric. Furthermore, the object-side surface 521 of the second lens element 520 includes at least one concave shape in an off-axial region thereof, and the object-side surface 521 and the image-side surface 522 of the second lens element 520 both include at least one inflection point.

The third lens element 530 with negative refractive power has an object-side surface 531 being concave in a paraxial region thereof and an image-side surface 532 being convex in a paraxial region thereof. The third lens element 530 is made of plastic material, and has the object-side surface 531 and the image-side surface 532 being both aspheric. Furthermore, the object-side surface 531 and the image-side surface 532 of the third lens element 530 both include at least one inflection point.

The fourth lens element 540 with negative refractive power has an object-side surface 541 being convex in a paraxial region thereof and an image-side surface 542 being concave in a paraxial region thereof. The fourth lens element 540 is made of plastic material, and has the object-side surface 541 and the image-side surface 542 being both aspheric. Furthermore, the object-side surface 541 and the image-side surface 542 of the fourth lens element 540 both include at least one inflection point.

The fifth lens element 550 with positive refractive power has an object-side surface 551 being convex in a paraxial region thereof and an image-side surface 552 being concave in a paraxial region thereof. The fifth lens element 550 is made of plastic material, and has the object-side surface 551 and the image-side surface 552 being both aspheric. Furthermore, the image-side surface 552 of the fifth lens element 550 includes at least one convex shape in an off-axial region thereof.

The IR-cut filter 560 is made of glass material and located between the fifth lens element 550 and the image surface 570, and will not affect a focal length of the optical photographing lens assembly.

The detailed optical data of the 5th embodiment are shown in Table 9 and the aspheric surface data are shown in Table 10 below.

TABLE 9

5th Embodiment
f = 2.81 mm, Fno = 2.15, HFOV = 46.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.117 | ASP | 0.343 | Glass | 1.542 | 62.9 | 6.64 |
| 2 | | 4.840 | ASP | 0.030 | | | | |
| 3 | Ape. Stop | Plano | | 0.278 | | | | |
| 4 | Lens 2 | 4.523 | ASP | 0.431 | Plastic | 1.544 | 55.9 | 4.23 |
| 5 | | −4.533 | ASP | 0.274 | | | | |
| 6 | Lens 3 | −0.844 | ASP | 0.495 | Plastic | 1.544 | 55.9 | −18.92 |
| 7 | | −1.110 | ASP | 0.040 | | | | |
| 8 | Lens 4 | 16.603 | ASP | 0.350 | Plastic | 1.650 | 21.4 | −13.73 |
| 9 | | 5.754 | ASP | 0.050 | | | | |
| 10 | Lens 5 | 1.127 | ASP | 0.594 | Plastic | 1.544 | 55.9 | 6.24 |
| 11 | | 1.374 | ASP | 0.800 | | | | |
| 12 | IR-cut filter | Plano | | 0.300 | Glass | 1.517 | 64.2 | — |
| 13 | | Plano | | 0.331 | | | | |
| 14 | Image | Plano | | — | | | | |

Note:
Reference wavelength is 587.6 nm (d-line).

TABLE 10

Aspheric Coefficients

| Surface # | 1 | 2 | 4 | 5 | 6 |
|---|---|---|---|---|---|
| k = | 7.9025E−01 | 1.0835E+01 | 5.0000E+00 | −1.1413E+01 | −5.2817E+00 |
| A4 = | −3.1713E−02 | −1.9430E−01 | −1.8965E−01 | −2.1081E−01 | −5.5314E−01 |
| A6 = | −4.1228E−01 | 1.7280E−02 | 2.3297E−01 | 3.3912E−01 | −3.6776E−02 |
| A8 = | 8.5935E−01 | −2.7308E−01 | −4.7428E−01 | −1.5459E+00 | 1.8917E+00 |
| A10 = | −6.3456E−01 | −4.3511E+00 | 2.3400E+01 | 1.8480E+00 | 1.1129E+00 |
| A12 = | −3.2492E+00 | 1.8437E+01 | −6.6749E+01 | 1.3532E+00 | −7.6606E+00 |
| A14 = | 7.1155E+00 | −2.6357E+01 | 8.8459E+01 | −5.9200E+00 | 7.6840E+00 |
| A16 = | −4.4160E+00 | 1.2216E+01 | −4.0940E+01 | 4.2328E+00 | −2.5026E+00 |

| Surface # | 7 | 8 | 9 | 10 | 11 |
|---|---|---|---|---|---|
| k = | −5.3978E−01 | −1.0000E+00 | −1.0000E+01 | −1.7094E+01 | −7.5372E+00 |
| A4 = | −2.9491E+00 | −3.4759E+00 | −1.2743E+00 | 2.0970E−01 | 9.8525E−02 |
| A6 = | 1.3877E+01 | 1.1887E+01 | 2.7904E+00 | −2.1275E−01 | −8.5732E−02 |
| A8 = | −3.6761E+01 | −2.4215E+01 | −3.8252E+00 | 1.0002E−01 | 3.2328E−02 |
| A10 = | 5.8171E+01 | 2.8731E+01 | 3.0804E+00 | −2.5749E−02 | −6.5673E−03 |
| A12 = | −5.2208E+01 | −1.9415E+01 | −1.4111E+00 | 3.4731E−03 | 6.8757E−04 |
| A14 = | 2.4552E+01 | 7.0065E+00 | 3.4415E−01 | −1.9281E−04 | −2.9349E−05 |
| A16 = | −4.7277E+00 | −1.0658E+00 | −3.4988E−02 | | |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.81 | (Sag31 − Sag32)/CT3 | 0.53 |
| Fno | 2.15 | Sag42/CT4 | −1.31 |
| HFOV [deg.] | 46.0 | (R3 + R4)/(R3 − R4) | 0.00 |
| V3/V4 | 2.61 | R5 × R6 [mm²] | 0.94 |
| V4 | 21.4 | |f2/f1| | 0.64 |
| CT1/CT2 | 0.80 | |f2/f3| + |f2/f4| | 0.53 |
| ATmax/(ΣAT − ATmax) | 0.85 | f4/f2 | −3.25 |
| ΣAT/f | 0.24 | | |

6th Embodiment

Figure 11:
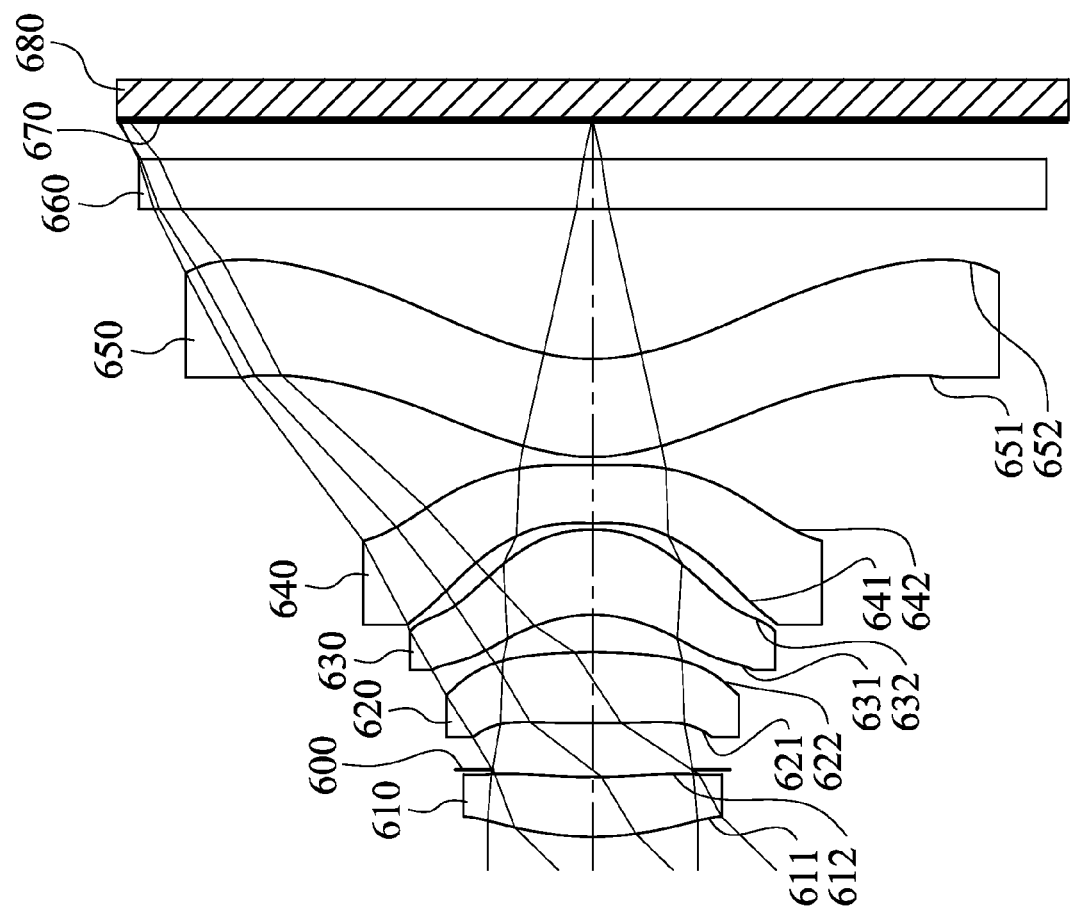
FIG. 11 is a schematic view of an image capturing apparatus according to the 6th embodiment of the present disclosure.
Figure 12:
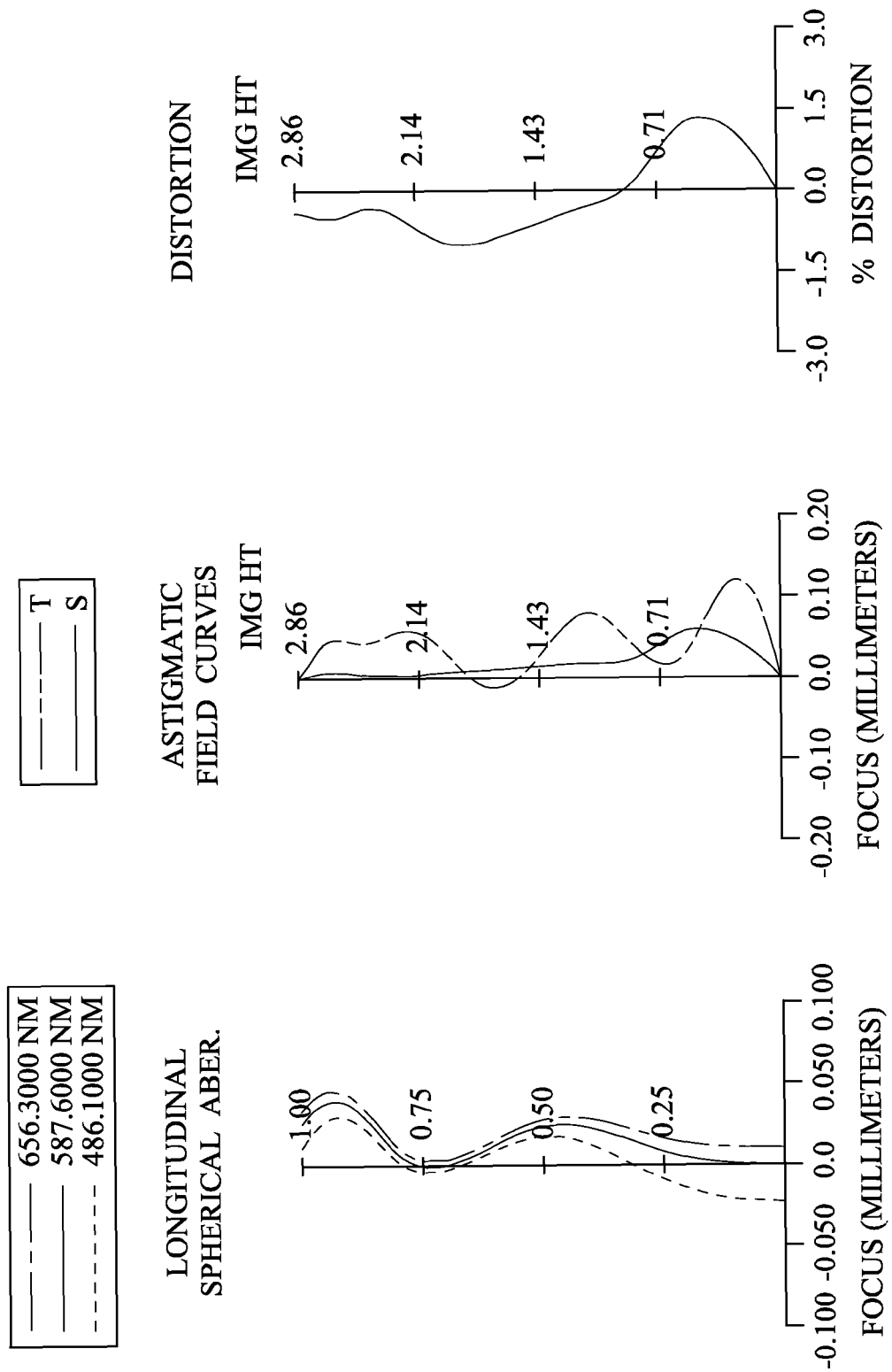
FIG. 12 shows spherical aberration curves, astigmatic field curves and a distortion curve of the image capturing apparatus according to the 6th embodiment.

FIG. 11 is a schematic view of an image capturing apparatus according to the 6th embodiment of the present disclosure. FIG. 12 shows spherical aberration curves, astigmatic field curves and a distortion curve of the image capturing apparatus according to the 6th embodiment. In FIG. 11, the image capturing apparatus includes an optical photographing lens assembly (its reference numeral is omitted) and an image sensor 680. The optical photographing lens assembly includes, in order from an object side to an image side, a first lens element 610, an aperture stop 600, a second lens element 620, a third lens element 630, a fourth lens element 640, a fifth lens element 650, an IR-cut filter 660 and an image surface 670, wherein the image sensor 680 is disposed on the image surface 670 of the optical photographing lens assembly. The optical photographing lens assembly has a total of five lens elements (610-650) with refractive power. There is an axial distance in a paraxial region between every two of the first lens element 610, the second lens element 620, the third lens element 630, the fourth lens element 640 and the fifth lens element 650 that are adjacent to each other.

The first lens element 610 with positive refractive power has an object-side surface 611 being convex in a paraxial region thereof and an image-side surface 612 being concave in a paraxial region thereof. The first lens element 610 is made of plastic material, and has the object-side surface 611 and the image-side surface 612 being both aspheric. Furthermore, the image-side surface 612 of the first lens element 610 includes at least one convex shape in an off-axial region thereof, and the object-side surface 611 and the image-side surface 612 of the first lens element 610 both include at least one inflection point.

The second lens element 620 with positive refractive power has an object-side surface 621 being convex in a paraxial region thereof and an image-side surface 622 being convex in a paraxial region thereof. The second lens element 620 is made of plastic material, and has the object-side surface 621 and the image-side surface 622 being both aspheric. Furthermore, the object-side surface 621 of the second lens element 620 includes at least one concave shape in an off-axial region thereof, and the object-side surface 621 and the image-side surface 622 of the second lens element 620 both include at least one inflection point.

The third lens element 630 with negative refractive power has an object-side surface 631 being concave in a paraxial region thereof and an image-side surface 632 being convex in a paraxial region thereof. The third lens element 630 is made of plastic material, and has the object-side surface 631 and the image-side surface 632 being both aspheric. Furthermore, the object-side surface 631 and the image-side surface 632 of the third lens element 630 both include at least one inflection point.

The fourth lens element 640 with negative refractive power has an object-side surface 641 being concave in a paraxial region thereof and an image-side surface 642 being concave in a paraxial region thereof. The fourth lens element 640 is made of plastic material, and has the object-side surface 641 and the image-side surface 642 being both aspheric. Furthermore, the object-side surface 641 and the image-side surface 642 of the fourth lens element 640 both include at least one inflection point.

The fifth lens element 650 with positive refractive power has an object-side surface 651 being convex in a paraxial region thereof and an image-side surface 652 being concave in a paraxial region thereof. The fifth lens element 650 is made of plastic material, and has the object-side surface 651 and the image-side surface 652 being both aspheric. Furthermore, the image-side surface 652 of the fifth lens element 650 includes at least one convex shape in an off-axial region thereof.

The IR-cut filter 660 is made of glass material and located between the fifth lens element 650 and the image surface 670, and will not affect a focal length of the optical photographing lens assembly.

The detailed optical data of the 6th embodiment are shown in Table 11 and the aspheric surface data are shown in Table 12 below.

TABLE 11

6th Embodiment
$f = 2.79$ mm, Fno = 2.22, HFOV = 45.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.865 ASP | 0.361 | Plastic | 1.544 | 55.9 | 5.80 |
| 2 | | 4.252 ASP | 0.041 | | | | |
| 3 | Ape. Stop | Plano | 0.280 | | | | |
| 4 | Lens 2 | 6.095 ASP | 0.427 | Plastic | 1.544 | 55.9 | 4.39 |
| 5 | | −3.825 ASP | 0.226 | | | | |
| 6 | Lens 3 | −0.851 ASP | 0.510 | Plastic | 1.544 | 55.9 | −13.98 |
| 7 | | −1.160 ASP | 0.040 | | | | |
| 8 | Lens 4 | −96.971 ASP | 0.347 | Plastic | 1.645 | 22.5 | −10.61 |
| 9 | | 7.371 ASP | 0.050 | | | | |
| 10 | Lens 5 | 1.020 ASP | 0.590 | Plastic | 1.544 | 55.9 | 5.04 |
| 11 | | 1.291 ASP | 0.900 | | | | |
| 12 | IR-cut filter | Plano | 0.300 | Glass | 1.517 | 64.2 | — |
| 13 | | Plano | 0.233 | | | | |
| 14 | Image | Plano | — | | | | |

Note:
Reference wavelength is 587.6 nm (d-line).
The effective radius of the surface 2 is 0.640 mm.

TABLE 12

Aspheric Coefficients

| Surface # | 1 | 2 | 4 | 5 | 6 |
|---|---|---|---|---|---|
| k = | 1.4327E+00 | 2.3918E+01 | −6.7446E+00 | −1.6494E+01 | −6.4377E+00 |
| A4 = | −6.4729E−03 | −2.0079E−01 | −1.1745E−01 | 5.0799E−02 | −5.7808E−01 |
| A6 = | −7.6849E−01 | 5.9045E−01 | −9.7991E−01 | −1.9397E+00 | −2.4440E−02 |
| A8 = | 4.1214E+00 | −8.0778E+00 | 4.0377E+00 | 7.9938E+00 | 1.9369E+00 |
| A10 = | −1.4250E+01 | 4.4864E+01 | −1.3580E+01 | −2.1637E+01 | 1.1187E+00 |
| A12 = | 2.6400E+01 | −1.4252E+02 | 1.3687E+01 | 3.4038E+01 | −7.6573E+00 |
| A14 = | −2.5311E+01 | 2.3650E+02 | −6.3285E−01 | −2.9297E+01 | 7.6666E+00 |
| A16 = | 9.4520E+00 | −1.5940E+02 | | 1.0828E+01 | −2.5264E+00 |

| Surface # | 7 | 8 | 9 | 10 | 11 |
|---|---|---|---|---|---|
| k = | −3.9335E−01 | −1.0000E+00 | 4.9455E+00 | −1.2299E+01 | −4.9945E+00 |
| A4 = | −2.9817E+00 | −3.4281E+00 | −1.2736E+00 | 1.9280E−01 | 7.4693E−02 |
| A6 = | 1.3907E+01 | 1.1871E+01 | 2.7938E+00 | −2.0731E−01 | −7.9222E−02 |
| A8 = | −3.6758E+01 | −2.4219E+01 | −3.8249E+00 | 9.9219E−02 | 3.1971E−02 |
| A10 = | 5.8170E+01 | 2.8737E+01 | 3.0796E+00 | −2.5550E−02 | −6.6789E−03 |
| A12 = | −5.2209E+01 | −1.9417E+01 | −1.4112E+00 | 3.4129E−03 | 7.0477E−04 |
| A14 = | 2.4550E+01 | 7.0064E+00 | 3.4434E−01 | −1.8644E−04 | −2.9974E−05 |
| A16 = | −4.7278E+00 | −1.0652E+00 | −3.5049E−02 | | |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.79 | (Sag31 − Sag32)/CT3 | 0.55 |
| Fno | 2.22 | Sag42/CT4 | −1.31 |
| HFOV [deg.] | 45.7 | (R3 + R4)/(R3 − R4) | 0.23 |
| V3/V4 | 2.48 | R5 × R6 [mm$^2$] | 0.99 |
| V4 | 22.5 | |f2/f1| | 0.76 |

-continued

| 6th Embodiment | | | |
|---|---|---|---|
| CT1/CT2 | 0.85 | |f2/f3| + |f2/f4| | 0.73 |
| ATmax/(ΣAT − ATmax) | 1.02 | f4/f2 | −2.42 |
| ΣAT/f | 0.23 | | |

7th Embodiment

Figure 13:
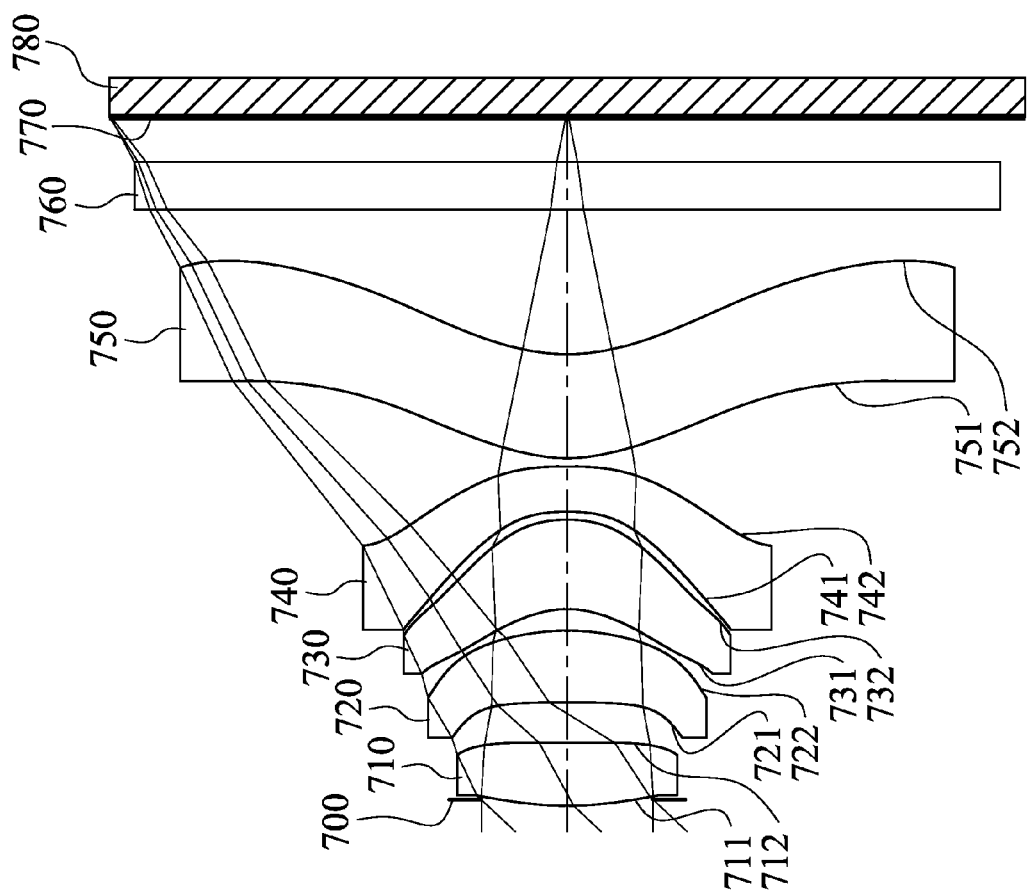
FIG. 13 is a schematic view of an image capturing apparatus according to the 7th embodiment of the present disclosure.
Figure 14:
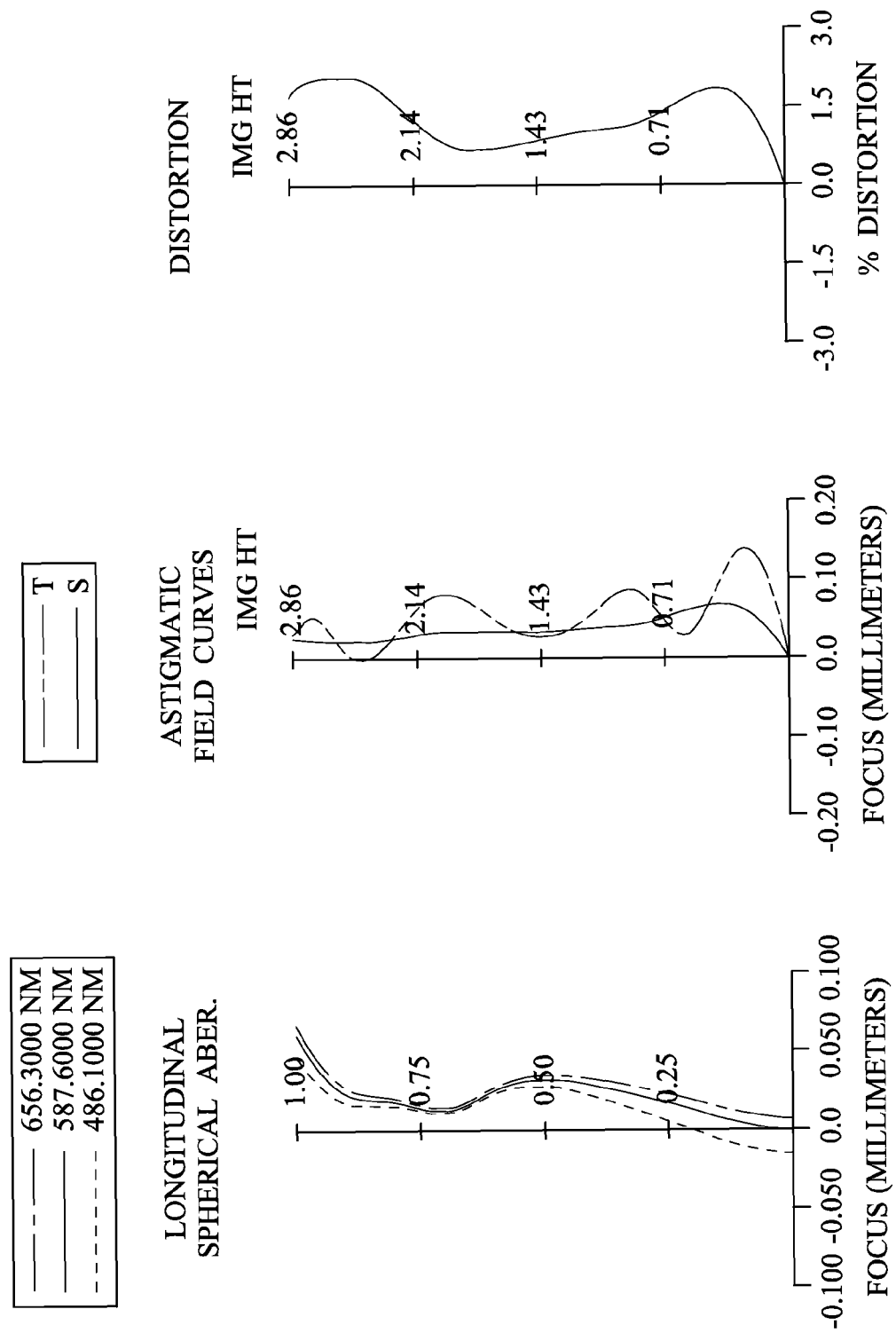
FIG. 14 shows spherical aberration curves, astigmatic field curves and a distortion curve of the image capturing apparatus according to the 7th embodiment.

FIG. 13 is a schematic view of an image capturing apparatus according to the 7th embodiment of the present disclosure. FIG. 14 shows spherical aberration curves, astigmatic field curves and a distortion curve of the image capturing apparatus according to the 7th embodiment. In FIG. 13, the image capturing apparatus includes an optical photographing lens assembly (its reference numeral is omitted) and an image sensor 780. The optical photographing lens assembly includes, in order from an object side to an image side, an aperture stop 700, a first lens element 710, a second lens element 720, a third lens element 730, a fourth lens element 740, a fifth lens element 750, an IR-cut filter 760 and an image surface 770, wherein the image sensor 780 is disposed on the image surface 770 of the optical photographing lens assembly. The optical photographing lens assembly has a total of five lens elements (710-750) with refractive power. There is an axial distance in a paraxial region between every two of the first lens element 710, the second lens element 720, the third lens element 730, the fourth lens element 740 and the fifth lens element 750 that are adjacent to each other.

The first lens element 710 with positive refractive power has an object-side surface 711 being convex in a paraxial region thereof and an image-side surface 712 being concave in a paraxial region thereof. The first lens element 710 is made of plastic material, and has the object-side surface 711 and the image-side surface 712 being both aspheric. Furthermore, the image-side surface 712 of the first lens element 710 includes at least one convex shape in an off-axial region thereof, and the object-side surface 711 and the image-side surface 712 of the first lens element 710 both include at least one inflection point.

The second lens element 720 with positive refractive power has an object-side surface 721 being concave in a paraxial region thereof and an image-side surface 722 being convex in a paraxial region thereof. The second lens element 720 is made of plastic material, and has the object-side surface 721 and the image-side surface 722 being both aspheric. Furthermore, the object-side surface 721 and the image-side surface 722 of the second lens element 720 both include at least one inflection point.

The third lens element 730 with negative refractive power has an object-side surface 731 being concave in a paraxial region thereof and an image-side surface 732 being convex in a paraxial region thereof. The third lens element 730 is made of plastic material, and has the object-side surface 731 and the image-side surface 732 being both aspheric. Furthermore, the object-side surface 731 and the image-side surface 732 of the third lens element 730 both include at least one inflection point.

The fourth lens element 740 with negative refractive power has an object-side surface 741 being concave in a paraxial region thereof and an image-side surface 742 being convex in a paraxial region thereof. The fourth lens element 740 is made of plastic material, and has the object-side surface 741 and the image-side surface 742 being both aspheric. Furthermore, the image-side surface 742 of the fourth lens element 740 includes at least one inflection point.

The fifth lens element 750 with positive refractive power has an object-side surface 751 being convex in a paraxial region thereof and an image-side surface 752 being concave in a paraxial region thereof. The fifth lens element 750 is made of plastic material, and has the object-side surface 751 and the image-side surface 752 being both aspheric. Furthermore, the image-side surface 752 of the fifth lens element 750 includes at least one convex shape in an off-axial region thereof.

The IR-cut filter 760 is made of glass material and located between the fifth lens element 750 and the image surface 770, and will not affect a focal length of the optical photographing lens assembly.

The detailed optical data of the 7th embodiment are shown in Table 13 and the aspheric surface data are shown in Table 14 below.

TABLE 13

7th Embodiment
f = 2.63 mm, Fno = 2.45, HFOV = 46.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.038 | | | | |
| 2 | Lens 1 | 2.202 ASP | 0.393 | Plastic | 1.544 | 55.9 | 4.34 |
| 3 | | 30.913 ASP | 0.252 | | | | |
| 4 | Lens 2 | −10.024 ASP | 0.449 | Plastic | 1.544 | 55.9 | 2.83 |
| 5 | | −1.355 ASP | 0.134 | | | | |
| 6 | Lens 3 | −0.625 ASP | 0.558 | Plastic | 1.514 | 56.8 | −10.17 |
| 7 | | −0.925 ASP | 0.050 | | | | |
| 8 | Lens 4 | −1.457 ASP | 0.283 | Plastic | 1.640 | 23.3 | −4.96 |
| 9 | | −2.901 ASP | 0.050 | | | | |
| 10 | Lens 5 | 0.952 ASP | 0.650 | Plastic | 1.544 | 55.9 | 4.16 |
| 11 | | 1.249 ASP | 0.900 | | | | |
| 12 | IR-cut filter | Plano | 0.300 | Glass | 1.517 | 64.2 | — |
| 13 | | Plano | 0.281 | | | | |
| 14 | Image | Plano | — | | | | |

Note:
Reference wavelength is 587.6 nm (d-line).

TABLE 14

Aspheric Coefficients

| Surface # | 2 | 3 | 4 | 5 | 6 |
|---|---|---|---|---|---|
| k = | 1.4327E+00 | −1.0000E+00 | 5.0000E+00 | −7.9032E+00 | −3.5610E+00 |
| A4 = | −4.0079E−02 | −1.9236E−01 | −7.0399E−02 | 1.2121E−01 | −3.3073E−01 |
| A6 = | 6.3218E−01 | 9.0679E−02 | −1.6038E+00 | −2.8824E+00 | −1.3284E−01 |
| A8 = | −2.4009E+01 | −3.6249E+00 | 4.2459E+00 | 1.3882E+01 | 1.7870E+00 |
| A10 = | 2.6905E+02 | 2.0269E+01 | −1.3819E+01 | −4.2953E+01 | 1.0310E+00 |
| A12 = | −1.4551E+03 | −7.1546E+01 | 8.6600E+00 | 7.5287E+01 | −7.6744E+00 |
| A14 = | 3.8033E+03 | 1.3512E+02 | 8.9198E+00 | −7.0845E+01 | 7.6881E+00 |
| A16 = | −3.8582E+03 | −1.0578E+02 | | 2.7729E+01 | −2.4823E+00 |

| Surface # | 7 | 8 | 9 | 10 | 11 |
|---|---|---|---|---|---|
| k = | −5.0690E−01 | −1.0000E+00 | −9.7752E+00 | −1.0098E+01 | −4.2747E+00 |
| A4 = | −2.9020E+00 | −3.3078E+00 | −1.1959E+00 | 1.8388E−01 | 6.0747E−02 |
| A6 = | 1.3916E+01 | 1.1967E+01 | 2.8010E+00 | −2.0655E−01 | −7.5716E−02 |
| A8 = | −3.6756E+01 | −2.4227E+01 | −3.8205E+00 | 9.9153E−02 | 3.1635E−02 |
| A10 = | 5.8119E+01 | 2.8718E+01 | 3.0807E+00 | −2.5501E−02 | −6.6902E−03 |
| A12 = | −5.2249E+01 | −1.9432E+01 | −1.4112E+00 | 3.4152E−03 | 7.1233E−04 |
| A14 = | 2.4546E+01 | 6.9961E+00 | 3.4412E−01 | −1.8707E−04 | −3.0511E−05 |
| A16 = | −4.7130E+00 | −1.0804E+00 | −3.5489E−02 | | |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.63 | (Sag31 − Sag32)/CT3 | 0.57 |
| Fno | 2.45 | Sag42/CT4 | −1.76 |
| HFOV [deg.] | 46.8 | (R3 + R4)/(R3 − R4) | 1.31 |
| V3/V4 | 2.44 | R5 × R6 [mm$^2$] | 0.58 |
| V4 | 23.3 | |f2/f1| | 0.65 |
| CT1/CT2 | 0.88 | |f2/f3| + |f2/f4| | 0.85 |
| ATmax/(ΣAT − ATmax) | 1.08 | f4/f2 | −1.75 |
| ΣAT/f | 0.18 | | |

8th Embodiment

Figure 15:
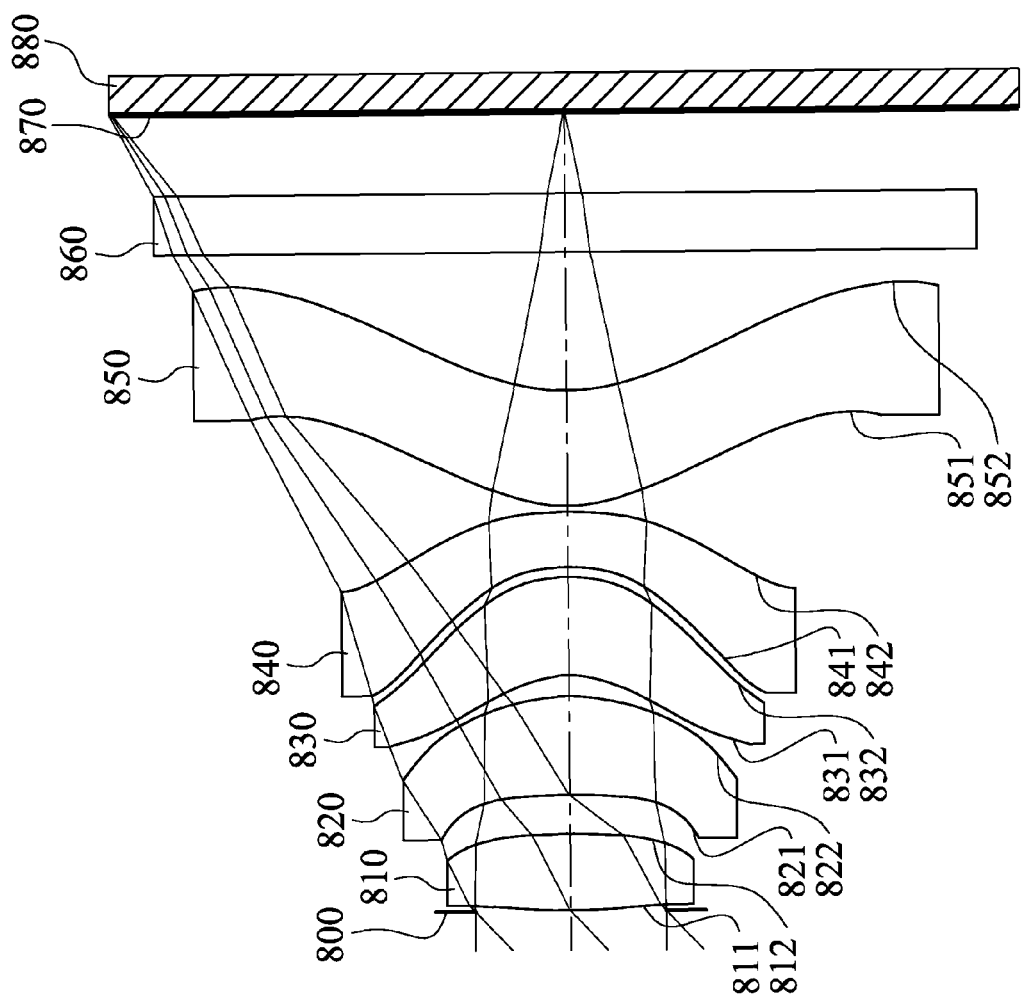
FIG. 15 is a schematic view of an image capturing apparatus according to the 8th embodiment of the present disclosure.
Figure 16:
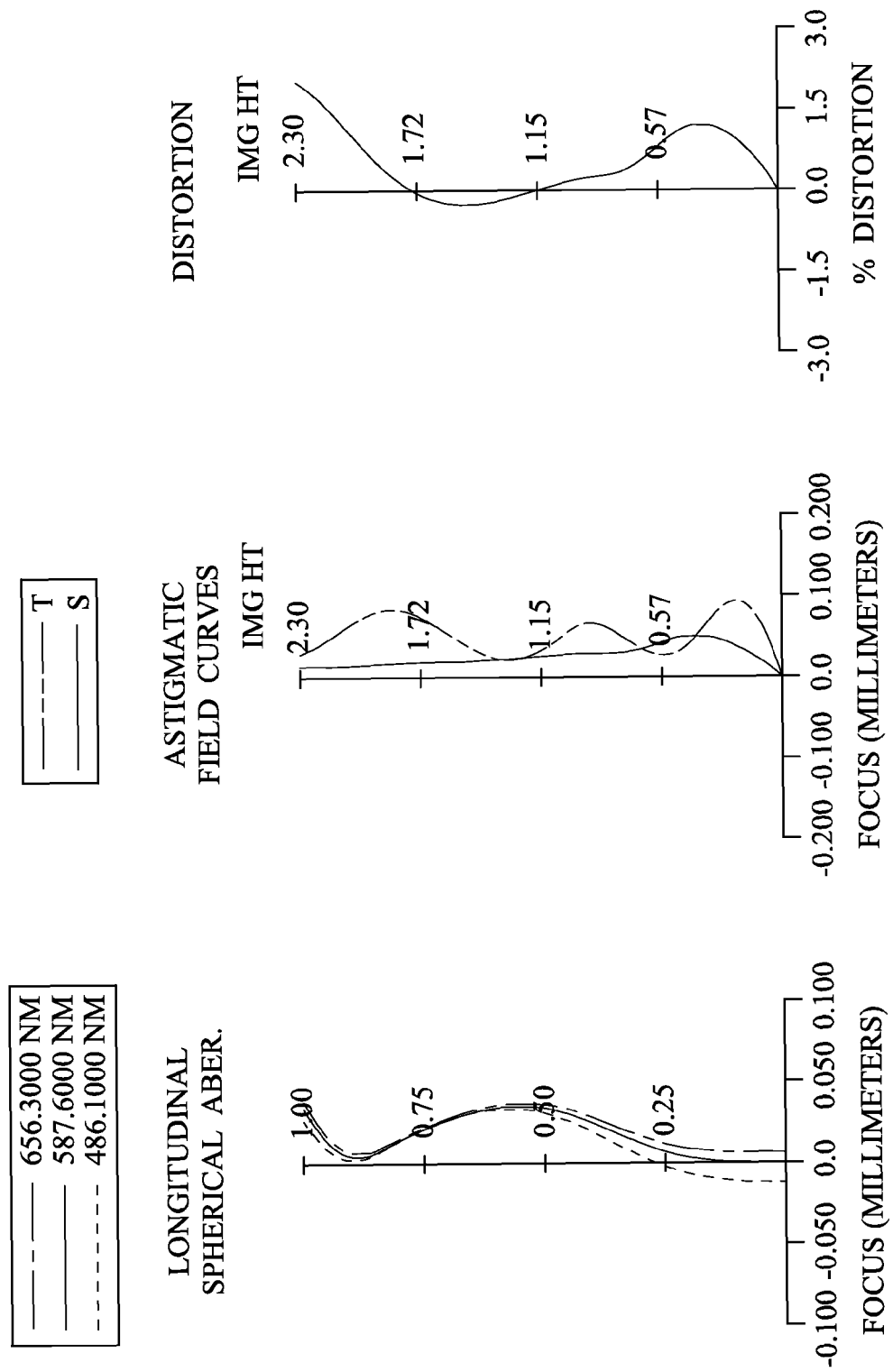
FIG. 16 shows spherical aberration curves, astigmatic field curves and a distortion curve of the image capturing apparatus according to the 8th embodiment.

FIG. 15 is a schematic view of an image capturing apparatus according to the 8th embodiment of the present disclosure. FIG. 16 shows spherical aberration curves, astigmatic field curves and a distortion curve of the image capturing apparatus according to the 8th embodiment. In FIG. 15, the image capturing apparatus includes an optical photographing lens assembly (its reference numeral is omitted) and an image sensor 880. The optical photographing lens assembly includes, in order from an object side to an image side, an aperture stop 800, a first lens element 810, a second lens element 820, a third lens element 830, a fourth lens element 840, a fifth lens element 850, an IR-cut filter 860 and an image surface 870, wherein the image sensor 880 is disposed on the image surface 870 of the optical photographing lens assembly.

The optical photographing lens assembly has a total of five lens elements (810-850) with refractive power. There is an axial distance in a paraxial region between every two of the first lens element 810, the second lens element 820, the third lens element 830, the fourth lens element 840 and the fifth lens element 850 that are adjacent to each other.

The first lens element 810 with positive refractive power has an object-side surface 811 being convex in a paraxial region thereof and an image-side surface 812 being convex in a paraxial region thereof. The first lens element 810 is made of plastic material, and has the object-side surface 811 and the image-side surface 812 being both aspheric. Furthermore, the image-side surface 812 of the first lens element 810 includes at least one convex shape in an off-axial region thereof, and the object-side surface 811 of the first lens element 810 includes at least one inflection point.

The second lens element 820 with positive refractive power has an object-side surface 821 being concave in a paraxial region thereof and an image-side surface 822 being convex in a paraxial region thereof. The second lens element 820 is made of plastic material, and has the object-side surface 821 and the image-side surface 822 being both aspheric. Furthermore, the object-side surface 821 of the second lens element 820 includes at least one concave shape in an off-axial region thereof, and the image-side surface 822 of the second lens element 820 includes at least one inflection point.

The third lens element 830 with negative refractive power has an object-side surface 831 being concave in a paraxial region thereof and an image-side surface 832 being convex in a paraxial region thereof. The third lens element 830 is made of plastic material, and has the object-side surface 831 and the image-side surface 832 being both aspheric. Furthermore, the object-side surface 831 and the image-side surface 832 of the third lens element 830 both include at least one inflection point.

The fourth lens element 840 with negative refractive power has an object-side surface 841 being concave in a paraxial region thereof and an image-side surface 842 being convex in a paraxial region thereof. The fourth lens element 840 is made of plastic material, and has the object-side surface 841 and the image-side surface 842 being both aspheric. Furthermore, the object-side surface 841 and the image-side surface 842 of the fourth lens element 840 both include at least one inflection point.

The fifth lens element 850 with positive refractive power has an object-side surface 851 being convex in a paraxial region thereof and an image-side surface 852 being concave in a paraxial region thereof. The fifth lens element 850 is made of plastic material, and has the object-side surface 851 and the image-side surface 852 being both aspheric. Furthermore, the image-side surface 852 of the fifth lens element 850 includes at least one convex shape in an off-axial region thereof.

The IR-cut filter 860 is made of glass material and located between the fifth lens element 850 and the image surface 870, and will not affect a focal length of the optical photographing lens assembly.

The detailed optical data of the 8th embodiment are shown in Table 15 and the aspheric surface data are shown in Table 16 below.

Moreover, these parameters can be calculated from Table 15 and Table 16 as the following values and satisfy the following conditions:

| 8th Embodiment | | | |
|---|---|---|---|
| f [mm] | 2.37 | (Sag31 − Sag32)/CT3 | 0.58 |
| Fno | 2.45 | Sag42/CT4 | −1.41 |
| HFOV [deg.] | 43.4 | (R3 + R4)/(R3 − R4) | 1.65 |
| V3/V4 | 2.44 | R5 × R6 [mm$^2$] | 0.48 |
| V4 | 23.3 | |f2/f1| | 0.63 |
| CT1/CT2 | 0.77 | |f2/f3| + |f2/f4| | 1.19 |

TABLE 15

8th Embodiment
f = 2.37 mm, Fno = 2.45, HFOV = 43.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.004 | | | | |
| 2 | Lens 1 | 3.360 | ASP | 0.387 | Plastic | 1.544 | 55.9 | 3.37 |
| 3 | | −3.869 | ASP | 0.198 | | | | |
| 4 | Lens 2 | −3.748 | ASP | 0.500 | Plastic | 1.544 | 55.9 | 2.11 |
| 5 | | −0.922 | ASP | 0.106 | | | | |
| 6 | Lens 3 | −0.505 | ASP | 0.499 | Plastic | 1.514 | 56.8 | −3.37 |
| 7 | | −0.953 | ASP | 0.050 | | | | |
| 8 | Lens 4 | −1.223 | ASP | 0.280 | Plastic | 1.640 | 23.3 | −3.72 |
| 9 | | −2.737 | ASP | 0.030 | | | | |
| 10 | Lens 5 | 0.715 | ASP | 0.587 | Plastic | 1.544 | 55.9 | 2.59 |
| 11 | | 1.031 | ASP | 0.700 | | | | |
| 12 | IR-cut filter | Plano | | 0.300 | Glass | 1.517 | 64.2 | — |
| 13 | | Plano | | 0.415 | | | | |
| 14 | Image | Plano | | — | | | | |

Note:
Reference wavelength is 587.6 nm (d-line).

TABLE 16

Aspheric Coefficients

| Surface # | 2 | 3 | 4 | 5 | 6 |
|---|---|---|---|---|---|
| k = | 1.0000E+00 | −1.0000E+00 | 1.0000E+00 | −6.6043E+00 | −3.8317E+00 |
| A4 = | −2.5796E−02 | −3.5069E−01 | −1.8004E−01 | 1.3607E−01 | −2.7188E−01 |
| A6 = | −2.6031E+00 | 1.3861E+00 | −2.1047E+00 | −3.9093E+00 | −1.5655E−01 |
| A8 = | 3.7523E+01 | −1.7908E+01 | 1.0948E+01 | 1.9805E+01 | 1.7854E+00 |
| A10 = | −3.3469E+02 | 9.3098E+01 | −5.4036E+01 | −5.9671E+01 | 1.0566E+00 |
| A12 = | 1.6361E+03 | −2.9435E+02 | 9.7716E+01 | 1.0148E+02 | −7.6115E+00 |
| A14 = | −4.1165E+03 | 5.2508E+02 | −6.1277E+01 | −9.2234E+01 | 7.7394E+00 |
| A16 = | 4.1099E+03 | −4.1580E+02 | | 3.5030E+01 | −2.4935E+00 |

| Surface # | 7 | 8 | 9 | 10 | 11 |
|---|---|---|---|---|---|
| k = | −1.0001E+00 | −1.0000E+00 | −2.7310E+00 | −5.6022E+00 | −2.7967E+00 |
| A4 = | −3.0095E+00 | −3.2139E+00 | −1.1677E+00 | 1.2484E−01 | 1.6562E−03 |
| A6 = | 1.3922E+01 | 1.1955E+01 | 2.8317E+00 | −1.6591E−01 | −4.7610E−02 |
| A8 = | −3.6764E+01 | −2.4239E+01 | −3.8166E+00 | 8.3754E−02 | 2.5039E−02 |
| A10 = | 5.8080E+01 | 2.8723E+01 | 3.0748E+00 | −2.4757E−02 | −6.4793E−03 |
| A12 = | −5.2281E+01 | −1.9419E+01 | −1.4138E+00 | 4.2822E−03 | 8.5694E−04 |
| A14 = | 2.4561E+01 | 7.0110E+00 | 3.4510E−01 | −3.7944E−04 | −5.0125E−05 |
| A16 = | −4.6391E+00 | −1.0534E+00 | −3.4095E−02 | | |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

-continued

| 8th Embodiment | | | |
|---|---|---|---|
| ATmax/(ΣAT − ATmax) | 1.06 | f4/f2 | −1.76 |
| ΣAT/f | 0.16 | | |

9th Embodiment

FIG. 19 is a schematic view of an electronic device 10 according to the 9th embodiment of the present disclosure. The electronic device 10 of the 9th embodiment is a smart phone, wherein the electronic device 10 includes an image capturing apparatus 11. The image capturing apparatus 11 includes an optical photographing lens assembly (not shown herein) according to the present disclosure and an image sensor (not shown herein), wherein the image sensor is disposed on an image surface of the optical photographing lens assembly.

10th Embodiment

FIG. 20 is a schematic view of an electronic device 20 according to the 10th embodiment of the present disclosure. The electronic device 20 of the 10th embodiment is a tablet personal computer, wherein the electronic device 20 includes an image capturing apparatus 21. The image capturing apparatus 21 includes an optical photographing lens assembly (not shown herein) according to the present disclosure and an image sensor (not shown herein), wherein the image sensor is disposed on an image surface of the optical photographing lens assembly.

11th Embodiment

Figure 21:
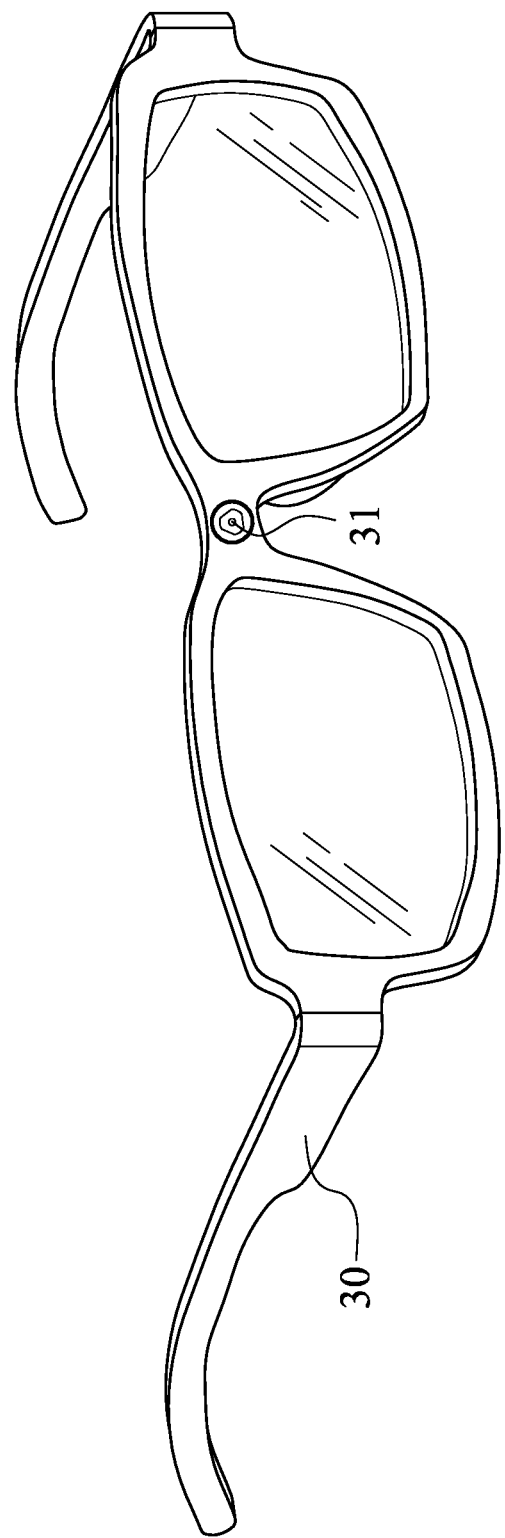
FIG. 21 is a schematic view of an electronic device according to the 11th embodiment of the present disclosure.

FIG. 21 is a schematic view of an electronic device 30 according to the 11th embodiment of the present disclosure. The electronic device 30 of the 11th embodiment is a head-mounted display (HMD), wherein the electronic device 30 includes an image capturing apparatus 31. The image capturing apparatus 31 includes an optical photographing lens assembly (not shown herein) according to the present disclosure and an image sensor (not shown herein), wherein the image sensor is disposed on an image surface of the optical photographing lens assembly.

The foregoing description, for purpose of explanation, has been described with reference to specific embodiments. It is to be noted that Tables 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens assembly comprising, in order from an object side to an image side:
   a first lens element with positive refractive power having an object-side surface being convex in a paraxial region thereof;
   a second lens element having positive refractive power;
   a third lens element having negative refractive power;
   a fourth lens element having negative refractive power; and
   a fifth lens element with positive refractive power having an image-side surface being concave in a paraxial region thereof, wherein the image-side surface of the fifth lens element comprises at least one convex shape in an off-axis region thereof, and an object-side surface and the image-side surface of the fifth lens element are aspheric;
   wherein the optical photographing lens assembly has a total of five lens elements, an axial distance is between every two lens elements of the first lens element, the second lens element, the third lens element, the fourth lens element and the fifth lens element which are adjacent to each other, a focal length of the first lens element is f1, a focal length of the second lens element is f2, and the following condition is satisfied:

$|f2/f1|<1.0$.

2. The optical photographing lens assembly of claim 1, wherein an Abbe number of the fourth lens element is V4, and the following condition is satisfied:

$V4<30$.

3. The optical photographing lens assembly of claim 1, wherein the focal length of the second lens element is f2, a focal length of the third lens element is f3, a focal length of the fourth lens element is f4, and the following condition is satisfied:

$|f2/f3|+|f2/f4|<1.0$.

4. The optical photographing lens assembly of claim 1, wherein the third lens element has an object-side surface being concave in a paraxial region thereof.

5. The optical photographing lens assembly of claim 1, wherein the second lens element has an object-side surface being convex in a paraxial region thereof and an image-side surface being convex in a paraxial region thereof.

6. The optical photographing lens assembly of claim 1, wherein the fourth lens element has an object-side surface being concave in a paraxial region thereof and an image-side surface being convex in a paraxial region thereof.

7. The optical photographing lens assembly of claim 1, wherein a curvature radius of an object-side surface of the third lens element is R5, a curvature radius of an image-side surface of the third lens element is R6, and the following condition is satisfied:

$0 \text{ mm}^2 < R5 \times R6$.

8. The optical photographing lens assembly of claim 1, wherein a curvature radius of an object-side surface of the second lens element is R3, a curvature radius of an image-side surface of the second lens element is R4, and the following condition is satisfied:

$-0.20<(R3+R4)/(R3-R4)<2.0$.

9. The optical photographing lens assembly of claim 1, wherein a sum of the axial distances between every two lens elements of the first lens element, the second lens element, the third lens element, the fourth lens element and the fifth lens element which are adjacent to each other is ΣAT, a focal length of the optical photographing lens assembly is f, and the following condition is satisfied:

$\Sigma AT/f<0.30$.

10. The optical photographing lens assembly of claim 1, wherein a central thickness of the first lens element is CT1, a central thickness of the second lens element is CT2, and the following condition is satisfied:

$0.20<CT1/CT2<1.25$.

11. The optical photographing lens assembly of claim 1, wherein a distance in parallel with an optical axis from an axial vertex on an image-side surface of the fourth lens element to a maximum effective radius position on the image-side surface of the fourth lens element is Sag42, a central thickness of the fourth lens element is CT4, and the following condition is satisfied:

$-1.50<Sag42/CT4<-0.60$.

12. The optical photographing lens assembly of claim 1, wherein an image-side surface of the first lens element comprises at least one convex shape in an off-axis region thereof, and an object-side surface of the second lens element comprises at least one concave shape in an off-axis region thereof.

13. The optical photographing lens assembly of claim 1, wherein a distance in parallel with an optical axis from an axial vertex on an object-side surface of the third lens element to a maximum effective radius position on the object-side surface of the third lens element is Sag31, a distance in parallel with the optical axis from an axial vertex on an image-side surface of the third lens element to a maximum effective radius position on the image-side surface of the third lens element is Sag32, a central thickness of the third lens element is CT3, and the following condition is satisfied:

$-0.50<(Sag31-Sag32)/CT3<0.75$.

14. The optical photographing lens assembly of claim 1, wherein at least one surface of each of the first lens element, the second lens element, the third lens element and the fourth lens element comprises at least one inflection point.

15. The optical photographing lens assembly of claim 1, wherein the focal length of the first lens element is f1, the focal length of the second lens element is f2, and the following condition is satisfied:

$|f2/f1|<0.80$.

16. The optical photographing lens assembly of claim 1, wherein a maximum of the axial distances between every two lens elements of the first lens element, the second lens element, the third lens element, the fourth lens element and the fifth lens element which are adjacent to each other is ATmax, a sum of the axial distances between every two lens elements of the first lens element, the second lens element, the third lens element, the fourth lens element and the fifth lens element which are adjacent to each other is ΣAT, and the following condition is satisfied:

$0.80<AT\text{max}/(\Sigma AT-AT\text{max})$.

17. The optical photographing lens assembly of claim 1, wherein the focal length of the second lens element is f2, a focal length of the fourth lens element is f4, and the following condition is satisfied:

$-20.0<f4/f2<-1.0$.

18. The optical photographing lens assembly of claim 17, wherein the focal length of the second lens element is f2, the focal length of the fourth lens element is f4, and the following condition is satisfied:

$-15.0<f4/f2<-1.5$.

19. The optical photographing lens assembly of claim 18, wherein the focal length of the second lens element is f2, the focal length of the fourth lens element is f4, and the following condition is satisfied:

$-10.0<f4/f2<-1.5$.

20. The optical photographing lens assembly of claim 1, wherein an Abbe number of the third lens element is V3, an Abbe number of the fourth lens element is V4, and the following condition is satisfied:

$0.80<V3/V4<3.0$.

21. An image capturing apparatus, comprising:
the optical photographing lens assembly of claim 1, and
an image sensor disposed on an image surface of the optical photographing lens assembly.

22. An electronic device, comprising:
the image capturing apparatus of claim 21.

23. An optical photographing lens assembly comprising, in order from an object side to an image side:
a first lens element with positive refractive power having an object-side surface being convex in a paraxial region thereof;
a second lens element having positive refractive power;
a third lens element having negative refractive power and having an object-side surface being concave in a paraxial region thereof;
a fourth lens element having negative refractive power; and
a fifth lens element having an image-side surface being concave in a paraxial region thereof, wherein the image-side surface of the fifth lens element comprises at least one convex shape in an off-axis region thereof, and an object-side surface and the image-side surface of the fifth lens element are aspheric;
wherein the optical photographing lens assembly has a total of five lens elements, an axial distance is between every two lens elements of the first lens element, the second lens element, the third lens element, the fourth lens element and the fifth lens element which are adjacent to each other, a focal length of the first lens element is f1, a focal length of the second lens element is f2, and the following condition is satisfied:

$|f2/f1|<1.0$.

24. The optical photographing lens assembly of claim 23, wherein an Abbe number of the fourth lens element is V4, and the following condition is satisfied:

$V4<30$.

25. The optical photographing lens assembly of claim 23, wherein the focal length of the second lens element is f2, a focal length of the third lens element is f3, a focal length of the fourth lens element is f4, and the following condition is satisfied:

$|f2/f3|+|f2/f4|<1.0$.

26. The optical photographing lens assembly of claim 23, wherein the second lens element has an object-side surface being convex in a paraxial region thereof and an image-side surface being convex in a paraxial region thereof.

27. The optical photographing lens assembly of claim 23, wherein the fourth lens element has an object-side surface being concave in a paraxial region thereof and an image-side surface being convex in a paraxial region thereof.

28. The optical photographing lens assembly of claim 23, wherein a curvature radius of an object-side surface of the third lens element is R5, a curvature radius of an image-side surface of the third lens element is R6, and the following condition is satisfied:

$0 \text{ mm}^2<R5 \times R6$.

29. The optical photographing lens assembly of claim 23, wherein a curvature radius of an object-side surface of the second lens element is R3, a curvature radius of an image-side surface of the second lens element is R4, and the following condition is satisfied:

$-0.20 < (R3+R4)/(R3-R4) < 2.0$.

30. The optical photographing lens assembly of claim 23, wherein a sum of the axial distances between every two lens elements of the first lens element, the second lens element, the third lens element, the fourth lens element and the fifth lens element which are adjacent to each other is ΣAT, a focal length of the optical photographing lens assembly is f, and the following condition is satisfied:

$\Sigma AT/f < 0.30$.

31. The optical photographing lens assembly of claim 23, wherein a central thickness of the first lens element is CT1, a central thickness of the second lens element is CT2, and the following condition is satisfied:

$0.20 < CT1/CT2 < 1.25$.

32. The optical photographing lens assembly of claim 23, wherein a distance in parallel with an optical axis from an axial vertex on an image-side surface of the fourth lens element to a maximum effective radius position on the image-side surface of the fourth lens element is Sag42, a central thickness of the fourth lens element is CT4, and the following condition is satisfied:

$-1.50 < Sag42/CT4 < -0.60$.

33. The optical photographing lens assembly of claim 23, wherein an image-side surface of the first lens element comprises at least one convex shape in an off-axis region thereof, and an object-side surface of the second lens element comprises at least one concave shape in an off-axis region thereof.

34. The optical photographing lens assembly of claim 23, wherein a distance in parallel with an optical axis from an axial vertex on an object-side surface of the third lens element to a maximum effective radius position on the object-side surface of the third lens element is Sag31, a distance in parallel with the optical axis from an axial vertex on an image-side surface of the third lens element to a maximum effective radius position on the image-side surface of the third lens element is Sag32, a central thickness of the third lens element is CT3, and the following condition is satisfied:

$-0.50 < (Sag31-Sag32)/CT3 < 0.75$.

35. The optical photographing lens assembly of claim 23, wherein at least one surface of each of the first lens element, the second lens element, the third lens element and the fourth lens element comprises at least one inflection point.

36. The optical photographing lens assembly of claim 23, wherein the focal length of the first lens element is f1, the focal length of the second lens element is f2, and the following condition is satisfied:

$|f2/f1| < 0.80$.

37. The optical photographing lens assembly of claim 23, wherein a maximum of the axial distances between every two lens elements of the first lens element, the second lens element, the third lens element, the fourth lens element and the fifth lens element which are adjacent to each other is ATmax, a sum of the axial distances between every two lens elements of the first lens element, the second lens element, the third lens element, the fourth lens element and the fifth lens element which are adjacent to each other is ΣAT, and the following condition is satisfied:

$0.80 < ATmax/(\Sigma AT - ATmax)$.

38. The optical photographing lens assembly of claim 23, wherein the focal length of the second lens element is f2, a focal length of the fourth lens element is f4, and the following condition is satisfied:

$-20.0 < f4/f2 < -1.0$.

39. The optical photographing lens assembly of claim 38, wherein the focal length of the second lens element is f2, the focal length of the fourth lens element is f4, and the following condition is satisfied:

$-15.0 < f4/f2 < -1.5$.

40. The optical photographing lens assembly of claim 39, wherein the focal length of the second lens element is f2, the focal length of the fourth lens element is f4, and the following condition is satisfied:

$-10.0 < f4/f2 < -1.5$.

41. The optical photographing lens assembly of claim 23, wherein an Abbe number of the third lens element is V3, an Abbe number of the fourth lens element is V4, and the following condition is satisfied:

$0.80 < V3/V4 < 3.0$.

42. An image capturing apparatus, comprising:
the optical photographing lens assembly of claim 23, and
an image sensor disposed on an image surface of the optical photographing lens assembly.

43. An electronic device, comprising:
the image capturing apparatus of claim 42.

* * * * *

UNITED STATES PATENT AND TRADEMARK OFFICE
CERTIFICATE OF CORRECTION

PATENT NO. : 9,625,680 B2  
APPLICATION NO. : 14/798746  
DATED : April 18, 2017  
INVENTOR(S) : Wei-Yu Chen It is certified that error appears in the above-identified patent and that said Letters Patent is hereby corrected as shown below:

In the Claims

In Claim 25 (Column 36, Line 49), please delete the equation "$|f2/f3|+|f2/f41<1.0$" and insert therefor: --$|f2/f3|+|f2/f4|<1.0$--

In Claim 37 (Column 38, Line 18) please delete the equation "$0.80 < ATmax/(\varepsilon AT-ATmax)$" and insert therefor: --$0.80 < ATmax/(\Sigma AT-ATmax)$--

Signed and Sealed this  
Nineteenth Day of September, 2017

Joseph Matal  
*Performing the Functions and Duties of the*  
*Under Secretary of Commerce for Intellectual Property and*  
*Director of the United States Patent and Trademark Office*